United States Patent
Ridge et al.

(10) Patent No.: US 9,020,848 B1
(45) Date of Patent: Apr. 28, 2015

(54) METHOD AND SYSTEM FOR TIME AND LOCATION TRACKING

(71) Applicant: ezNova Technologies LLC, Allen, TX (US)

(72) Inventors: Jason Ridge, Frisco, TX (US); Raya Khashab, Allen, TX (US)

(73) Assignee: ezNova Technologies LLC, Allen, TX (US)

( * ) Notice: Subject to any disclaimer, the term of this patent is extended or adjusted under 35 U.S.C. 154(b) by 0 days.

(21) Appl. No.: 14/328,170

(22) Filed: Jul. 10, 2014

(51) Int. Cl.
| | |
|---|---|
| G07C 1/10 | (2006.01) |
| G06Q 10/00 | (2012.01) |
| G06Q 40/00 | (2012.01) |
| H04W 4/00 | (2009.01) |
| H04W 4/02 | (2009.01) |
| G06Q 10/06 | (2012.01) |
| G06Q 10/10 | (2012.01) |

(52) U.S. Cl.
CPC ............ *G06Q 40/125* (2013.12); *H04W 4/008* (2013.01); *H04W 4/021* (2013.01); *G06Q 10/063114* (2013.01); *G06Q 10/1091* (2013.01)

(58) Field of Classification Search
CPC .............................................. G06Q 10/06312
See application file for complete search history.

(56) References Cited

U.S. PATENT DOCUMENTS

| 7,343,316 | B2 * | 3/2008 | Goto et al. ................... 705/7.16 |
| 2002/0175211 | A1 * | 11/2002 | Dominquez et al. .......... 235/492 |
| 2008/0177646 | A1 * | 7/2008 | Frink .............................. 705/32 |
| 2013/0006718 | A1 * | 1/2013 | Nielsen et al. ............... 705/7.42 |
| 2013/0085861 | A1 * | 4/2013 | Dunlap ...................... 705/14.58 |
| 2013/0090968 | A1 * | 4/2013 | Borza ........................... 705/7.16 |
| 2013/0211975 | A1 * | 8/2013 | Masterson et al. ............. 705/28 |
| 2014/0278645 | A1 * | 9/2014 | Davidson et al. ............ 705/7.15 |

* cited by examiner

*Primary Examiner* — Mussa A Shaawat
(74) *Attorney, Agent, or Firm* — David W. Carstens; Austin C. Teng; Carstens & Cahoon, LLP

(57) ABSTRACT

A method for tracking time and location of an employee based on a predefined schedule. This method may uses time tracking software installed on a mobile device to detect the presence (or lack of presence) of an electronic signal emitted by a NFC (near field communication), BLE (Bluetooth Low Energy), or other wireless device. The detection may trigger the mobile application to communicate to a server to determine if the employee is scheduled to work at a work zone, which may result in the mobile application clocking in/out the employee. Also, geofencing may be used in combination with scheduling to clock in/out employees when entering a geofenced area determined by the employer. These location detection embodiments of the present invention may be used individually or in combination to improve location accuracy. A supervisor may also use this system to review the timesheets, make changes and integrate the data into a Payroll system.

25 Claims, 23 Drawing Sheets

METHOD AND SYSTEM FOR TIME AND LOCATION TRACKING

BACKGROUND OF THE INVENTION

Using software as a time attendance tracking method has existed for some time. Also, in recent years, NFC (near field communication) and BLE (Bluetooth Low Energy) technologies have entered the market allowing software to react to the wireless signals when detected. Most applications in the market today use NFC or BLE technology for marketing. For example, delivering a coupon to a customer's mobile phone when they are within range of the NFC and/or BLE signals or greeting the customer when they near the front of the store (where a BLE device has been installed). Recently, the consumption of NFC or BLE technology has expanded past advertising and is being adopted to automate tasks. In the realm of employee/employer time tracking, a few companies have started to release implementations that take some advantage of the wireless devices. For example, offering the ability to clock in/out employees automatically when entering or exiting the range of the wireless signals. However, the existing implementations do not leverage the devices along with additional intelligence (such as making clock in/out decisions based on the specific employee's schedule). Employers have a great need to use one or combination of the wireless technologies along with the intelligence to have accurate reports on an employee's total hours worked without having to worry about having to groom for incorrect clock entries that didn't correspond to their schedule. To our knowledge, prior art is lacking the ability for an employee to be automatically clocked in/out in accurately and according to a schedule. Instead, prior art simply tracks arrival or departure times.

SUMMARY OF THE INVENTION

The present invention relates to a method and system for tracking time and location of an employee based on a predetermined schedule (date and time) and optionally an assigned work zone. This method uses a mobile device to detect the presence (or lack of presence) of an electronic signal emitted by a NFC, BLE, or other wireless device that will trigger the mobile device to communicate to a server to determine if the employee is scheduled to work at a specific work zone (if available) or not and make an intelligent decision to clock the employee in or out for their shift.

In addition, the method and system may also allow manual clock in/out in case of failures such as back-end server outages or a signal could not be detected during a scheduled shift. The manual override status is saved to a server so the supervisor of the employee may know an override has happened. The method and system may also be used for other purposes that are not related to employee time attendance as well (such as employee location tracking—for security purposes).

The mobile application may send information to the server, either in real-time or in a batch request mode, and this data may be captured and stored in a database. The information may be a time stamp, a status or location of the mobile device.

The system uses various location based devices or technologies, individually or in combination to determine the accuracy of the location of the clock in/out time stamp. In one exemplary embodiment of the present invention, an employee of a retail store or restaurant may arrive at work, and the mobile application on the mobile device may detect a signal from a BLE device located at the work zone, which indicates that he is at the work zone. Throughout this application, any reference to a mobile device could be satisfied by a mobile phone, or any wearable device or item that can communicate with the NFC, BLE, or other wireless device. Combining the information with the work schedule stored in the databases, the mobile application may automatically clock them in. The same applies to clocking out the employee.

In another exemplary embodiment of the present invention, an employee may clock in/out NFC technology. In such embodiment, the employees arriving at a job site may tap their mobile device that supports NFC technology to the NFC device and again checking their schedule the system can automatically clock them in or out.

Additionally, geofencing may be used in combination with scheduling to automatically clock in/out employees when the employee enters a geofenced area determined by the employer. BLE devices, NFC devices, and geofencing may be used in the present invention individually or in combination to improve location accuracy.

In one exemplary embodiment, all three techniques explained (geofencing, NFC and BLE) may be used to determine the location of the mobile device running the time tracking software, thereby increasing accuracy and correctness. An exemplary embodiment of the present invention may apply where field technicians or remote employees may work in a work zone with no set location. The BLE device may be located at a remote location or inside an automobile, but since the BLE device may be portable and moved, the geofencing technology may be used as an additional component to confirm that the BLE device is located in a certain area.

In another exemplary embodiment of the present invention, an employer may want to verify that an employee is at a booth in a conference. The BLE device may be located at the booth to ensure the individual is near the booth; geofencing may be used to confirm the location of the BLE device; and for additional verification, an employer may request that the employee tap the mobile device to a NFC device located near the BLE device to ensure that he did not abandon the booth by leaving their mobile device at the table. This tapping activity may happen randomly or at set times, as defined by the employer.

Other features and advantages of the present invention are also described. In one exemplary embodiment, the present invention may be used to prevent employees from entering restricted areas. In one exemplary embodiment of the present invention, a work zone may be restricted to only authorized employees, as defined by a supervisor. In another exemplary embodiment, employees may enter a restricted area; however, the mobile application on the mobile devices may detect a signal unique to the BLE device associated with the restricted zone, and the software may notify the supervisor. In yet another exemplary embodiment of the present invention, the mobile application may be recording how long and how often an employee takes a break. The event is captured by the BLE device and the mobile device when they enter and exit a designated break area.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 6 graphically illustrates an exemplary embodiment of the method of the present invention using a BLE device in the case of an employee clocking in.

FIG. 11 graphically illustrates an exemplary embodiment of the method of the present invention using a NFC device in the case of an employee clocking in.

FIG. 16 graphically illustrates an exemplary embodiment of the method of the present invention using a geofencing technique in the case of an employee clocking in.

DETAILED DESCRIPTION OF THE INVENTION

As shown in the accompanying drawings, for purposes of illustration, the present invention uses specific methods and technologies to clock an employee in or out based on his schedule using a mobile application.

Employees may include, but may not be limited to, full-time employees, part-time employees, and independent contractors. Employees may also include any privately employed wage earner. Generally, employees have a scheduled work shift, and employees generally clock in at the beginning of their scheduled work shift and clock out at the end of their scheduled work shift. Clocking in and out generally involves recording the time that the employee enters and leaves the work zone at the prescribed times.

Figure 1:
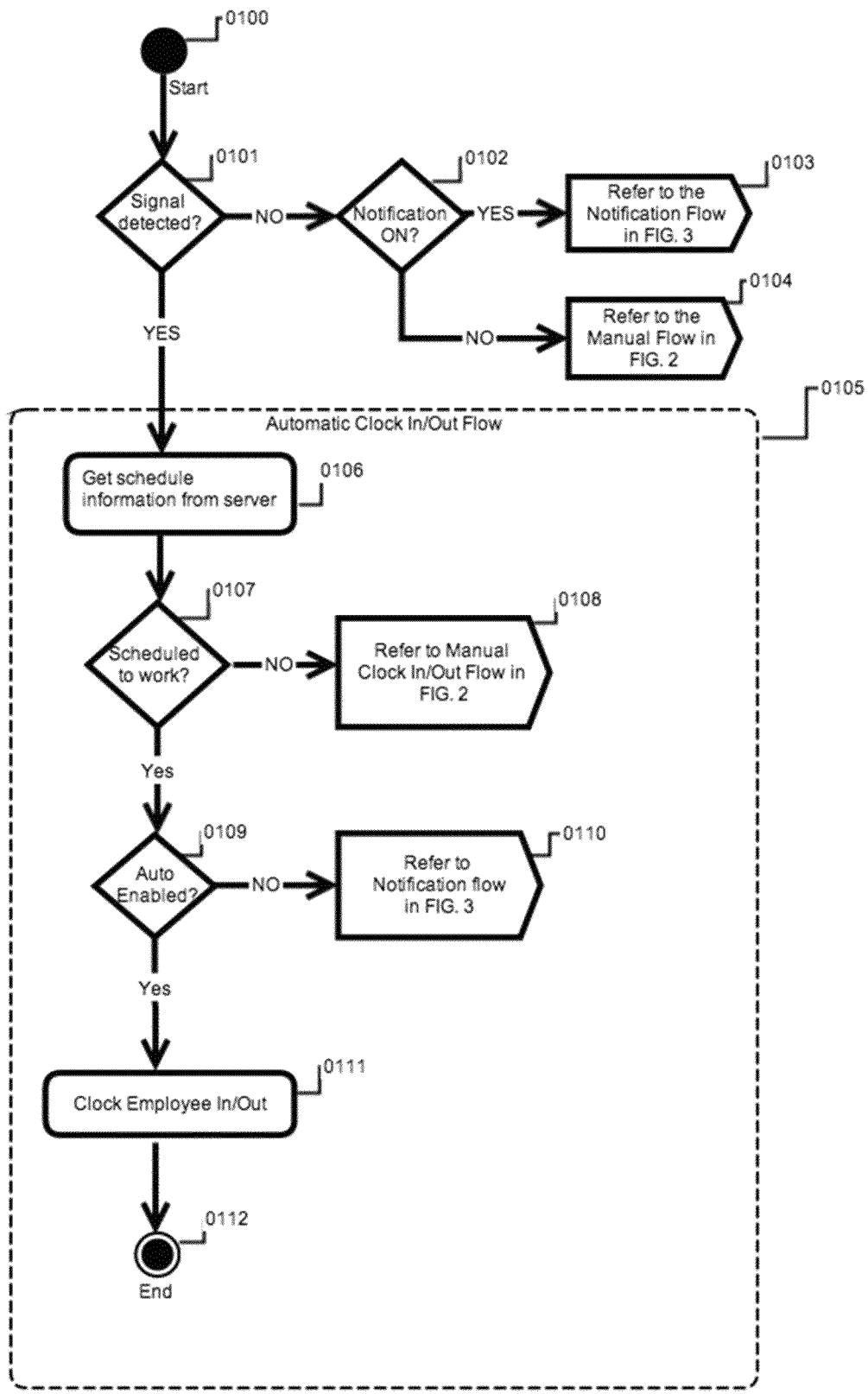
FIG. 1 illustrates a flow diagram of an exemplary embodiment of the present invention, in which the flow diagram demonstrates the clock in/out flow including the automatic clock in/out flow and steps that may necessitate using the manual clock in/out flow.

In FIG. 1, an employee may have a mobile device that may be running a mobile time clock application (step 0100). The employee may enter into a work zone, and the mobile application on the mobile device may scan the area near the employee for a signal (step 0101) from at least one low energy device. A low energy device may be a Bluetooth Low Energy (BLE) device, a Near Field Communication (NFC) device, a wireless router (Wi-Fi), or a global positioning system (GPS). A work zone may include more than one low energy device. If the mobile application on the mobile device does not detect a signal from a low energy device, then the mobile application may determine whether the employee has configured the mobile application to receive notifications from a server (step 0102). If the mobile application is configured to receive notifications from a server, the mobile application may use the steps as further explained in FIG. 3 (step 0103). If, on the hand, the mobile device is not configured to receive notifications from a server, the mobile application may use the steps as further explained in FIG. 2 (step 0104). Step 0104 may also occur in other exemplary embodiments where the system of the present invention may have an issue with the employee's mobile device. Such issues may include the mobile device not working; the employee forgetting the mobile device at another location; the work zone not including a low energy device sending a signal to the mobile application on the mobile device; and the system not supporting the operating system or the older version of the mobile application on the mobile device. Step 0104 may also occur in exemplary embodiments where the system may be having software issues (e.g., the mobile application is not running, the mobile application is not installed on the mobile device). In another exemplary embodiment, the server may be having issues (e.g., the server is down, the mobile application may have lost connection with a public computer or communications network and thereby cannot communicate with the server, or the server cannot retrieve the employee's work schedule). In such embodiment, the mobile application may cache the data to the mobile device and attempt to send to the server at a later time, using the steps as described in FIG. 1.

Otherwise, the mobile device is in a signal range and has detected at least one signal from at least one low energy device. The mobile application then may enter the automatic clock in/out flow 0105. The automatic clock in/out flow 0105 allows the mobile application to automatically clock in/out the employee, without any input from the employee. In this series of steps, the mobile application will send a request to the server (step 0106) asking if the employee is scheduled or not within a defined threshold (step 0107). The server may be an apparatus that comprises a processor, memory, and a connection to a data or communications network, such as the Internet or any other computer or communications network. The server may also communicate with a database that stores the employee's work schedule. The server may retrieve the employee's work schedule from the database, and may send a response to the mobile device about the employee's work schedule. If the mobile application receives a response from the server that indicates that the employee is not scheduled to work, then the mobile application may give the option to the employee to manually clock in (step 0108) which references FIG. 2. On the other hand, if the mobile application receives a response from the server that indicates that the employee is scheduled to work, then the mobile application will check if the employee enabled the automatic clocking in/out functionality (step 0109). If the employee did not enable automatic clocking in/out, then the mobile application may use the steps as shown in FIG. 3 (step 0110). On the other hand, if the employee did enable automatic clocking in/out, then the mobile application clocks the employee in/out (step 0111). At the end 0112 of the automatic clock in/out flow 0105, the employee is either clocked in or out.

Figure 2:
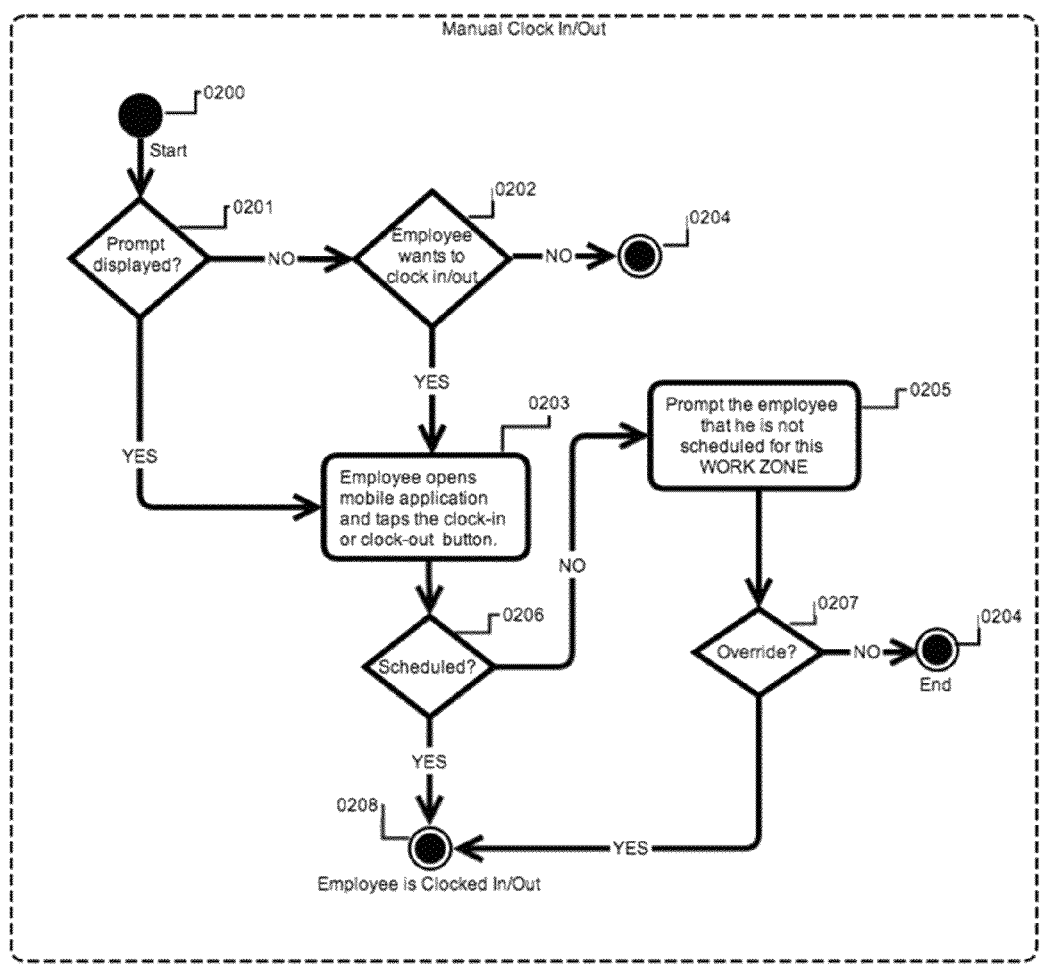
FIG. 2 illustrates a manual clock in/out flow of an exemplary embodiment of the present invention.
Figure 3:
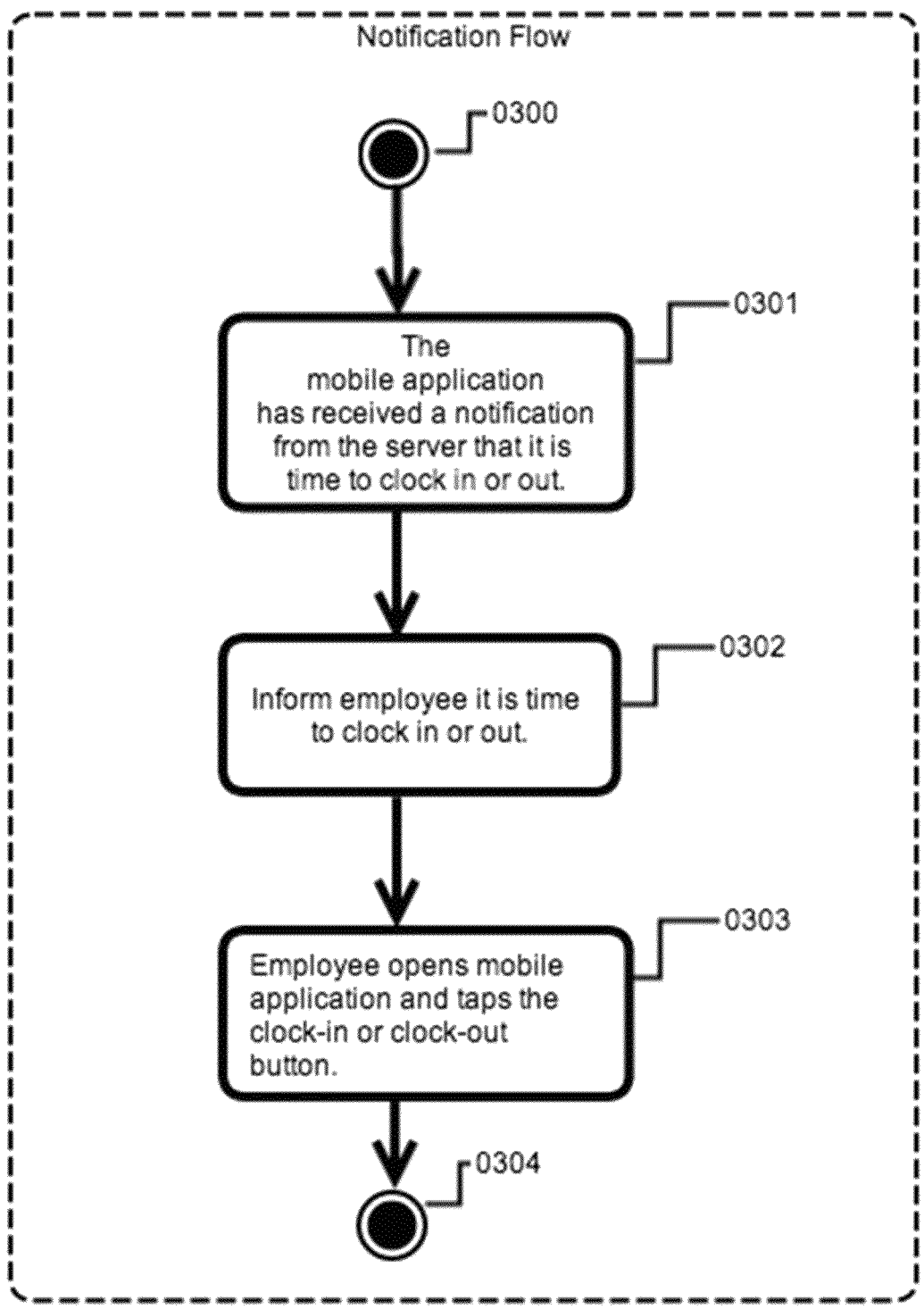
FIG. 3 illustrates a clock in/out flow of an exemplary embodiment of the present invention resulting from a notification from the server to the mobile application.

FIG. 2 illustrates a manual clock in/out flow of an exemplary embodiment of the present invention. The automatic clock in/out flow 0105, as shown in FIG. 1, does not require an action from the employee or from the user of the mobile application, except in the scenario where the employee is not scheduled to work. Compared to the automatic clock in/out flow, a manual clock in/out requires an action from the user of the mobile application and may be initiated in two ways. The mobile application may begin using the steps of the manual clock in/out flow 0200 in determining whether the employee is prompted by the mobile application to push a button on the mobile application's graphic user interface (GUI) to clock in/out (step 0201). If the mobile application prompts the employee to manually clock in/out (step 0201), then employee may open the mobile application and press the clock in/out button on the GUI (step 0203). The mobile application may also begin using the steps of the manual clock in/out flow 0200 when the employee wants to clock in/out without any prompt from the mobile application (step 0202). If the employee wants to manually clock in/out without a prompt from the mobile application, then the employee may open the mobile application and presses the clock in/out button on the GUI (step 0203). After the employee presses the GUI clock in/out button, the mobile application may determine whether the employee is scheduled to work (step 0206). The mobile application may communicate with the server using a public computer or communications network. The server may then communicate with the database that stores the employee's work schedule. The mobile application may receive a communication from the server to assist in determining whether the employee is scheduled to work. If the employee is scheduled to work, then the mobile application may change the employee's status to clocked in/out based on the employee's previous status of being clocked out/in (step 0208). In the case that the employee is not scheduled to work, the mobile application may inform the employee that he is not scheduled to work at the work zone (step 0205). The mobile application may prompt the employee to override the work schedule stored in the database (step 0207). If the employee chooses not to override the work schedule stored in the database, the mobile application may not change the employee's status (step 0204). If, on the other hand, the employee chooses to override the work schedule, in which the employee is not scheduled, the mobile application may change the employee's status to clocked in/out based on the previous status to clocked in/out based on the employee's previous status of being clocked out/in (step 0208).

FIG. 3 illustrates a clock in/out flow of an exemplary embodiment of the present invention resulting from a notification from the server to the mobile application. The steps involving a notification may occur when the automatic clock in/out functionality is enabled on the mobile device, as shown in steps 0109 and 0110 of FIG. 1. It may also occur when the mobile application detects that the signal detection functionality of the mobile device is not enabled, as shown in steps 0102 and 0103 of FIG. 1. When an event triggers the notification flow 0300, the mobile application may receive a notification from the server to inform the employee to clock in/out (step 0301). The mobile application may display a message to the employee with the time or information to clock in/out (step 0302). The employee may open the mobile application and press the GUI's clock in/out button (step 0303). At the end of the notification flow 0300, the employee is either clocked in or out (step 0304).

Exemplary Embodiments Using Bluetooth Technology

Figure 4:
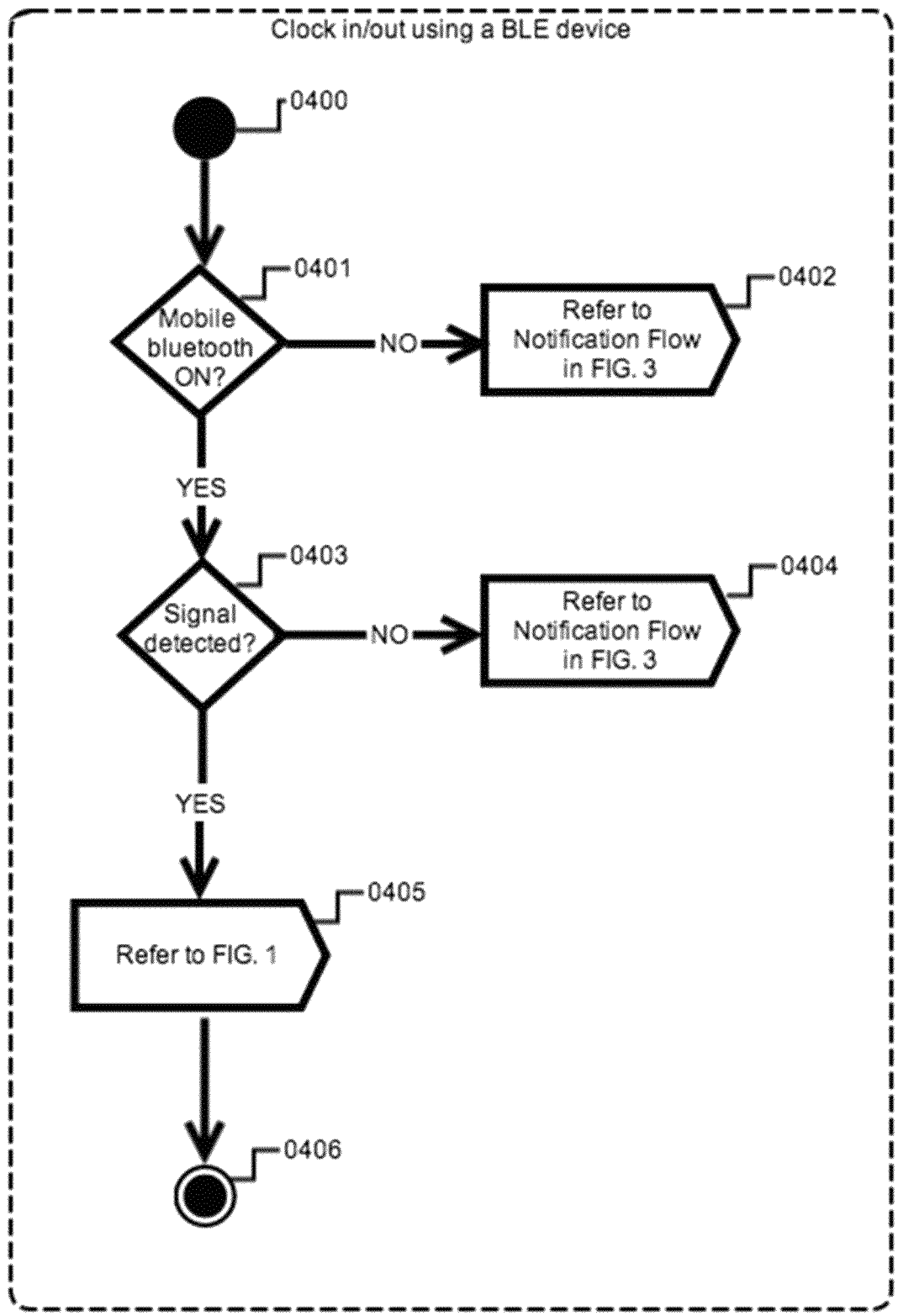
FIG. 4 illustrate a flowchart of an exemplary embodiment of the present invention that demonstrates clock in/out activity when the mobile device detects a signal from a Bluetooth low energy (BLE) device.

FIG. 4 illustrates a flowchart of an exemplary embodiment of the present invention that demonstrates clock in/out activity when the mobile device detects a signal from using a BLE device. The employee may be arriving at the work zone and wishes to clock in (step 0400), or the employee may be already clocked in. If the mobile device does not have the Bluetooth detection setting turned on (step 0401), then the mobile application on the mobile device may use the steps of the notification flow (step 0402) as explained earlier in FIG. 3. If the Bluetooth detection setting is turned on and the mobile device detects a signal from a BLE uniquely defined for that location (step 0403), then the mobile application may proceed to clock in the employee (step 0405), as shown in FIG. 1. On the other hand, if the Bluetooth detection setting is turned on and yet the mobile device does not detect a signal from a BLE, then the mobile application may use the steps of the notification flow (step 0404), as explained earlier in FIG. 3. After step 0405, the flow may end (step 0406).

Figure 5:
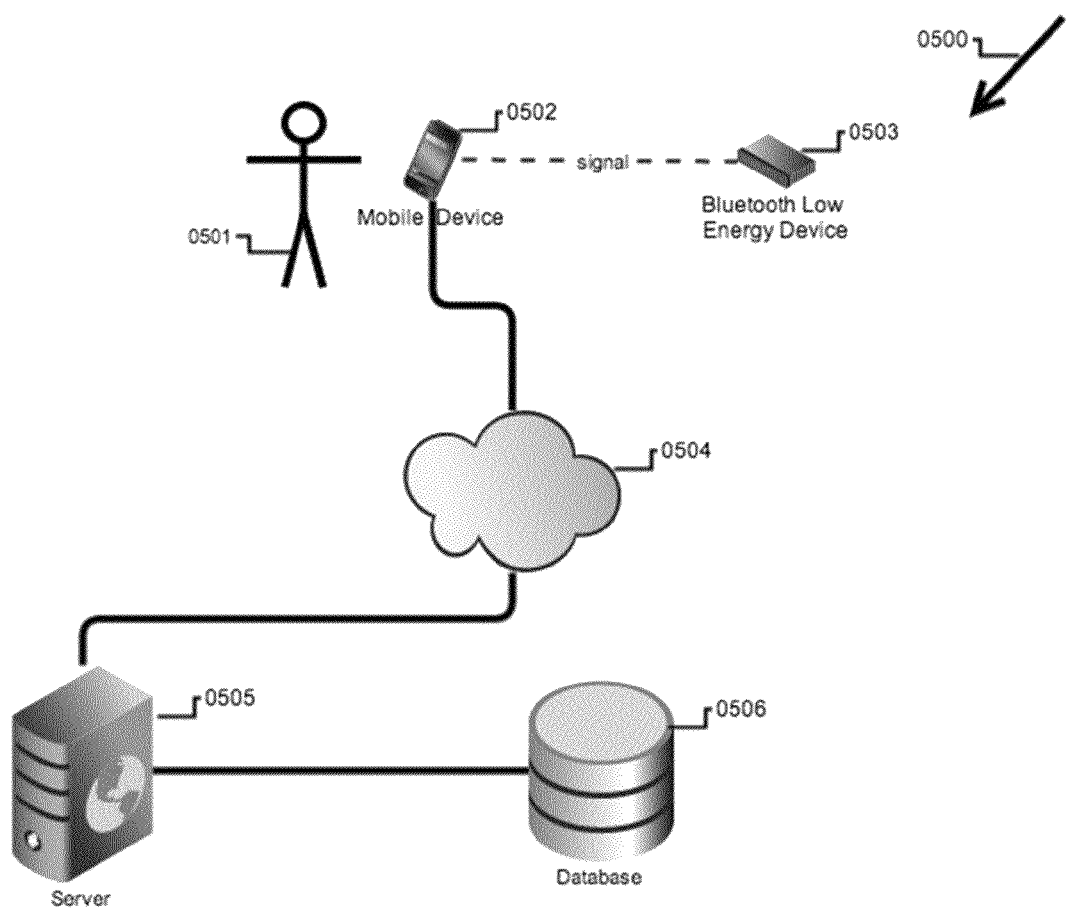
FIG. 5 illustrates an exemplary embodiment of the system used in the clock in/out flow using a BLE device.

FIG. 5 illustrates exemplary embodiment of the system 0500 of components used during a clock in/out flow using BLE devices. The employee 0501 may own or possess a mobile device 0502. The employee may arrive at a work zone. The work zone may be associated with a BLE device 0503. When the mobile device 0502 detects a signal from a BLE device 0503, the mobile application on the mobile device 0502 may send a request to the server 0505 through a public computer or communications network 0504 (e.g., the cloud network) during the course of clocking the employee in/out. The mobile application may be requesting for the employee's work schedule. After receiving a request from the mobile application, the server 0505 may communicate with a database 0506 to store and retrieve event data. Event data may include data that relates to the employee's location, the employee's work schedule, the employee's clock in/out times that fall within the employee's work schedule. The server 0505, after receiving event data from the database, may send the requested data through the public computer or communications network 0504 to the mobile application on the mobile device 0502.

Figure 6:
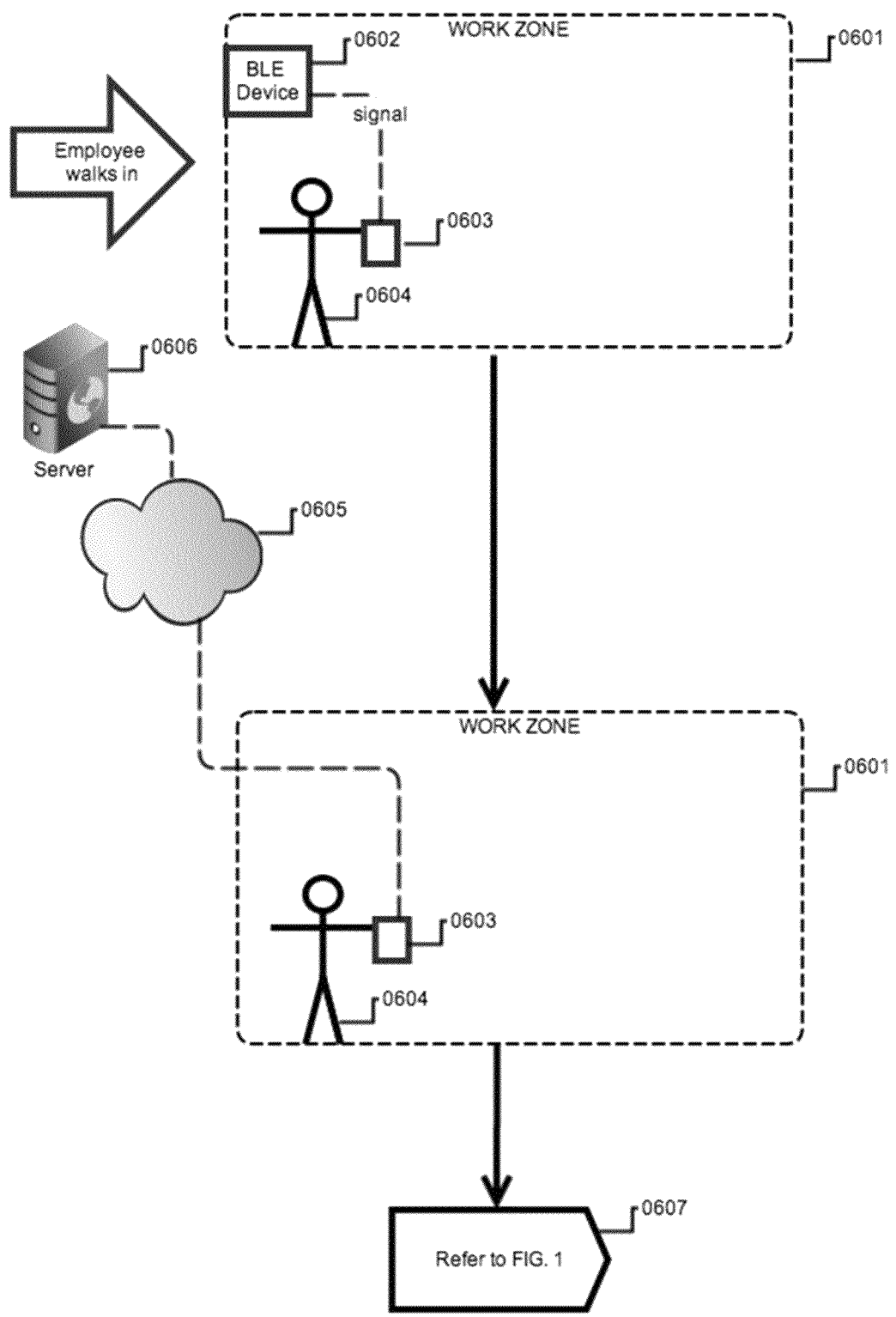

FIG. 6 graphically illustrates an exemplary embodiment of the method of the present invention using a BLE device in the case of an employee clocking in. When the employee 0601 enters the work zone 0601 which is associated with a BLE device 0602, the employee's mobile device 0603 may detect a signal from the BLE device 0602 The mobile application on the mobile device 0603 will send a request to the server 0606 through a public computer or communications network 0605 to get the employee's work schedule. After the mobile application on the mobile device 0603 receives the employee's work schedule from the server 0606 (through the public computer or communications network 0605), the mobile application will determine if the employee 0604 is scheduled to work. If the employee 0604 is scheduled to work in the work zone 0601, then the mobile application may clock in the employee 0604, manually or automatically (step 0607), as explained earlier in FIG. 1.

Figure 7:
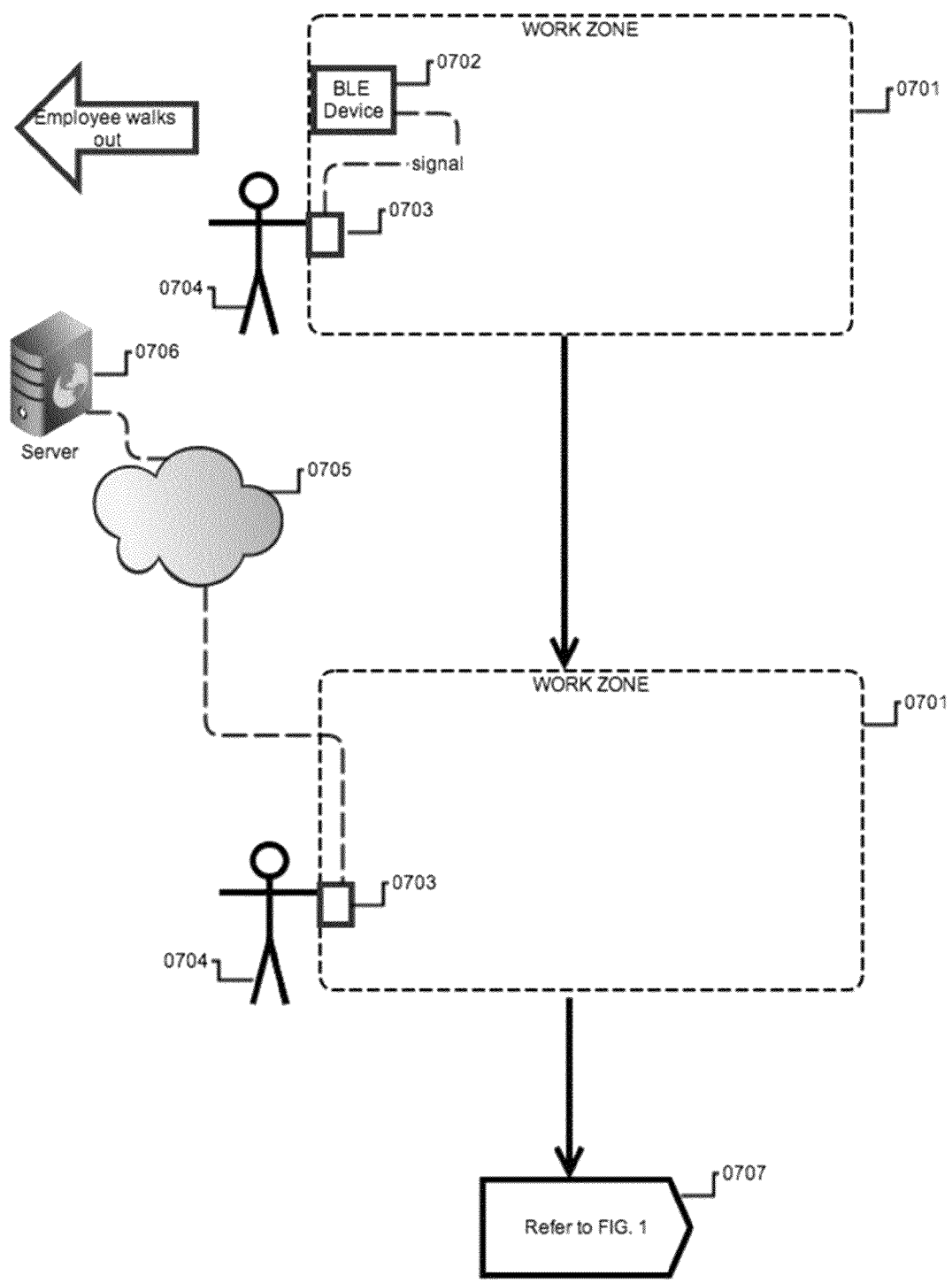
FIG. 7 graphically illustrates an exemplary embodiment of the method of the present invention with a BLE device in the case of an employee clocking out.

FIG. 7 graphically illustrates an exemplary embodiment of the method of the present invention with a BLE device in the case of an employee clocking out. When the employee 0704 enters the work zone 0701 which it is associated with a BLE device 0702, the employee's mobile device 0704 may detect a signal from the BLE device 0702. The mobile application on the mobile device 0703 will send a request to the server 0706 through a public computer or communications network 0705 to get the employee's work schedule. After the mobile application on the mobile device 0703 receives the employee's work schedule from the server 0706 (through the public computer or communications network 0705), the mobile application will determine if the employee 0704 is scheduled to clock out. If the employee 0704 is scheduled to clock out and leave the work zone 0701, then the mobile application may clock out the employee 0704, manually or automatically (step 0707), as explained earlier in FIG. 1.

Exemplary Embodiments using NFC Technology

Figure 8:
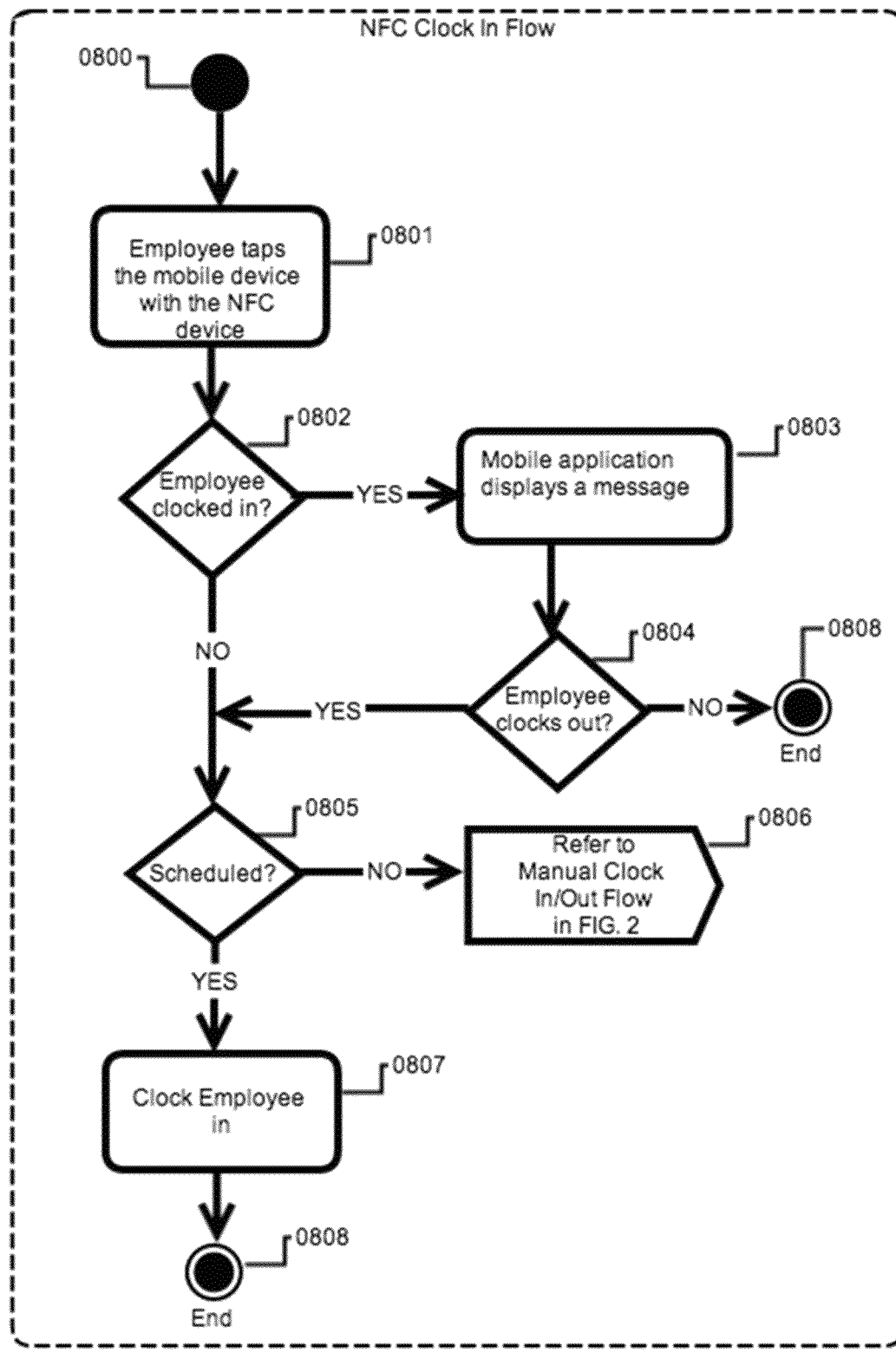
FIG. 8 is a flowchart of an exemplary embodiment that illustrates a clock in flow using a Near Field Communication (NFC) device.

FIG. 8 is a flowchart of an exemplary embodiment that illustrates a clock in flow using a Near Field Communication (NFC) device. Upon arriving at the work zone (step 0800), the employee may tap his mobile device with the NFC device at the work zone (step 0801). This step 0801 of tapping the mobile device with the NFC device allows communication between the NFC device and the mobile device. This step 0801 may also enable functionality on the mobile device to send communications through a public computer or communications network. The action of tapping the NFC device with the mobile device is discussed later in the explanation of FIG. 11. After step 0801, the mobile application on the mobile device may check if the employee has already clocked in (step 0802). If the employee is clocked in according to the mobile application, then the mobile application may display a message on the GUI to prompt action from the employee (step 0803). This message may inform the employee that he is already clocked in and may need to clock out before clocking in. If the employee chooses not to clock out at step 0804, then the clock in activity may end (step 0808). If, on the other hand, the employee chooses to clock out (step 0804), then the mobile application may return to the steps that may occur if the employee was not clocked in (step 0805). Thereby, if the employee is not already clocked in or if the employee chooses to clock out when he was already clocked in, then the mobile application, and subsequently the mobile device, may communicate with the server through a public computer or communications network to retrieve the employee's work schedule. Upon receiving the employee's work schedule, the mobile application will check if the employee is scheduled to work or clock in (step 0805). If the employee is not scheduled to work or clock in, then the mobile application may manually clock in the employee (step 0806), as explained earlier in FIG. 2. If, on the other hand, the employee is scheduled to work or clock in, then the mobile application may clock the employee in (step 0807), automatically or manually. After step 0807, the clock in activity may end (step 0808).

Figure 9:
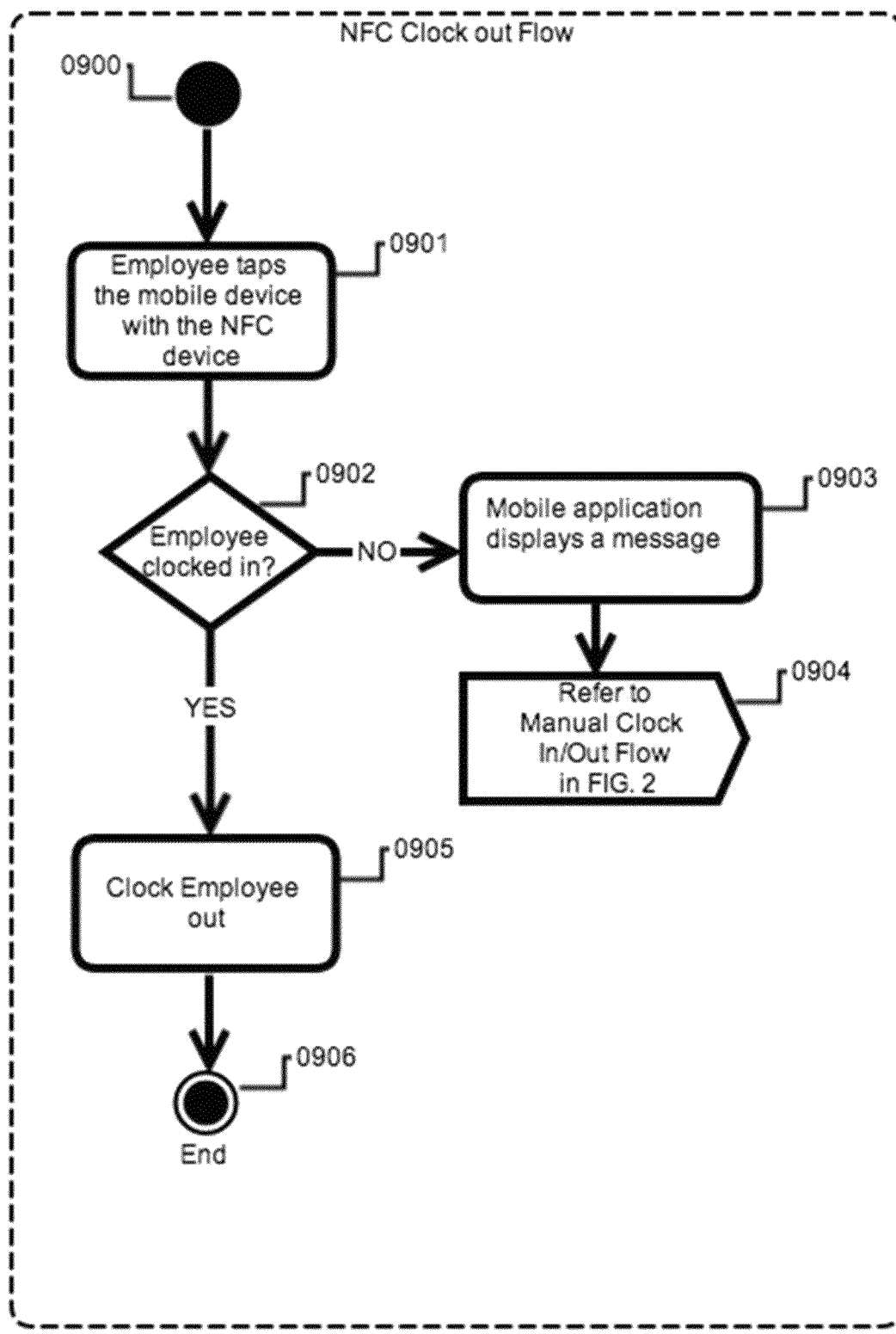
FIG. 9 is a flowchart of an exemplary embodiment that illustrates a clock out flow using a Near Field Communication device.

FIG. 9 is a flowchart of an exemplary embodiment that illustrates a clock out flow using a Near Field Communication device. The flowchart of FIG. 10 details the clock in activity beginning with the employee already inside the work zone (step 0900). At this step 0900, the employee may want to clock out or the employee may be prompted to clock out. The employee may also know that it is time to clock out as according to his schedule. The employee may tap his mobile device with the NFC device (step 0901). As explained earlier with FIG. 9, the signal the mobile device may receive from the NFC device may enable functionality on the mobile device to facilitate communication with the server through a public computer or communications network. After step 0901, the mobile application may check if the employee has already clocked in (step 0902). If the employee is not clocked in, then the mobile application may display a message on the GUI to prompt action from the employee (step 0903). This message may inform the employee that the mobile application cannot find a record of the employee clocking in. The message may further inform the employee that he may need to manually clock in/out. The mobile application may then assist the employee in clocking out (step 0904), manually or automatically. If, on the other hand, the mobile application determines that the employee is already clocked in at step 0902, meaning that the mobile application found a record of the employee clocking in, then the mobile application may assist the employee with clocking out, manually or automatically (step 0905). After clocking the employee out (step 0905), the clock out activity in this exemplary embodiment of the NFC clock in flow may end (step 0906).

Figure 10:
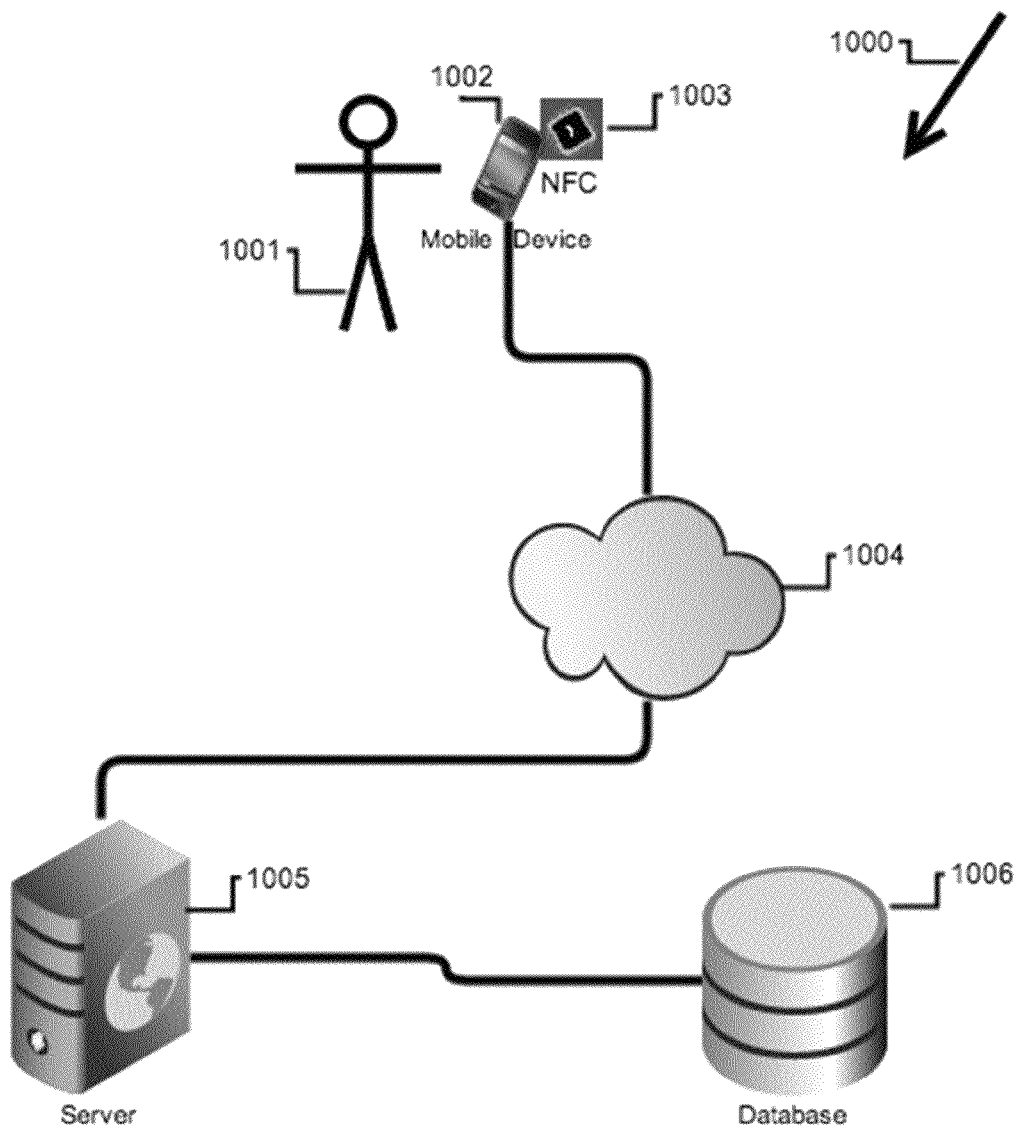
FIG. 10 illustrates an exemplary embodiment of the system used in the clock in/out flow using a NFC device.

FIG. 10 illustrates an exemplary embodiment of a system 1000 of components used during a clock in/out flow using a NFC device. An employee 1001 may own or possess a mobile device 1002, and the work zone may be associated with a NFC device 1003. When the employee 1001 taps the mobile device 1002 with the NFC device 1003, a signal may be sent from the NFC device 1003 to the mobile device 1002. The mobile application on the mobile device 1002 may interpret the signal from the NFC device 1003 and may communicate the server 1005 through a public computer or communications network 1004 (such as the cloud or the Internet). The mobile application may send to the server 1005 through the public computer or communications network 1004 a message about detecting a signal from a NFC device 1003. Additionally, the mobile application may inform the server 1005 that the employee 1001 may need to clock in/out. The mobile application may send a request to the server 1005 through the public computer or communications network 1004 while clocking in/out the employee 1001. As the mobile application (through the public computer or communications network 1004) communicates with the server 1005, event data may be read from and written to the database 1006. Event data, as mentioned earlier, may include data that relates to the employee's location, the employee's work schedule, the employee's clock in/out times that fall within the employee's work schedule. The server 1005, after receiving event data from the database 1006, may send requested event data through the public computer or communications network 1004 to the mobile application on the mobile device 1002.

Figure 11:
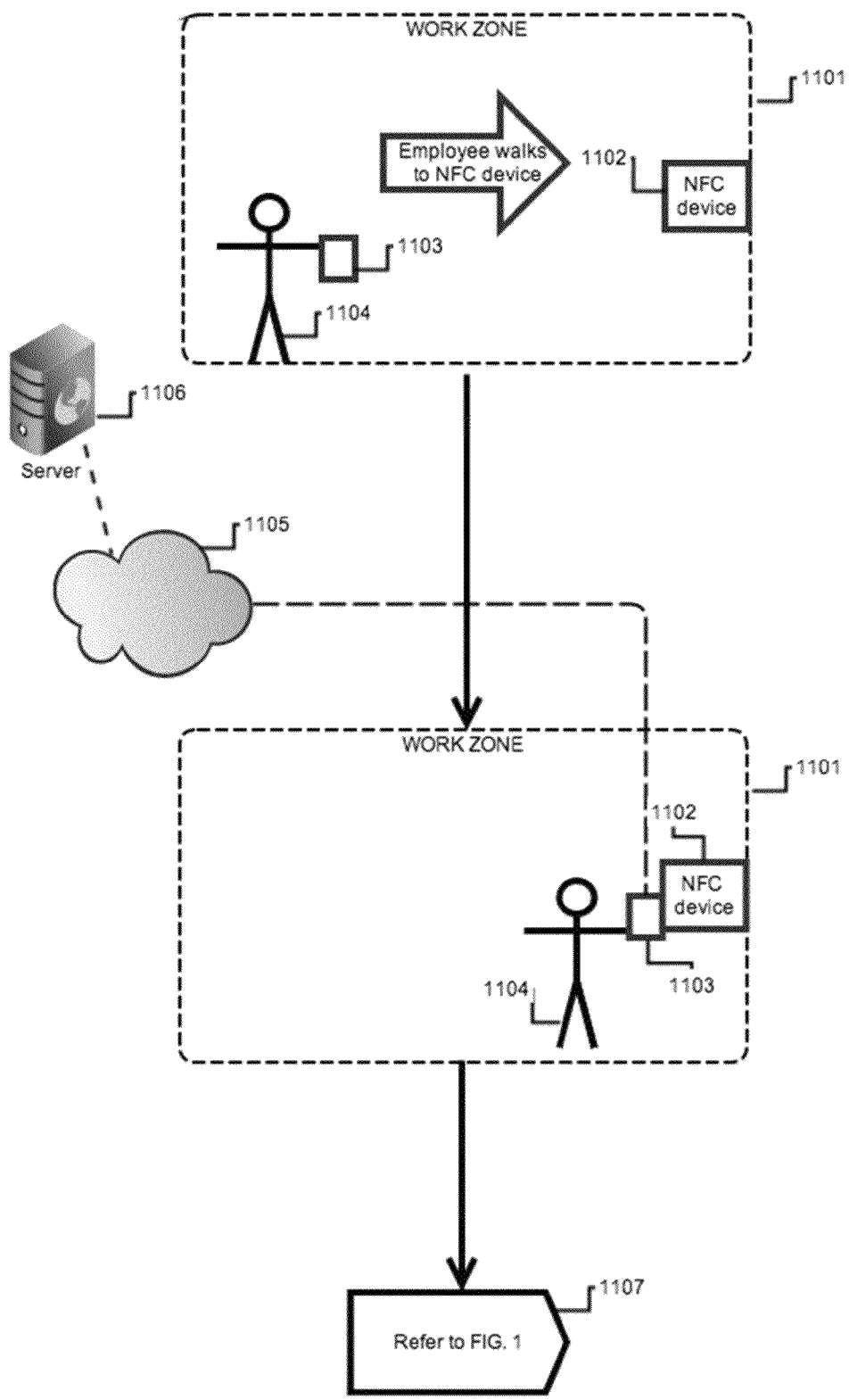

FIG. 11 graphically illustrates an exemplary embodiment of the method of the present invention using a NFC device in the case of an employee clocking in. When the employee 1104 enters the work zone 1101 with a mobile device 1103 associated with the employee 1104, the employee 1104 may move towards the NFC device 1102. The employee 1104 may tap the NFC device 1102 with the mobile device 1103. Tapping the NFC device 1102 with the mobile device 1103 may involve positioning the mobile device 1103 within close proximity of the NFC device 1102 for the mobile device 1103 to receive a signal from the NFC device 1102. Tapping the NFC device 1102 with the mobile device 1103 may also involve positioning the mobile device 1103 to physically contact the NFC device 1102 for the mobile device 1103 to receive a signal from the NFC device 1102. The mobile device 1103 may detect a signal from the NFC device 1102. Upon the mobile device 1103 detecting a signal from the NFC device 1102, the mobile application on the mobile device 1103 may send to the server 1106 through a public computer or communications network 1105 a message that an employee 1104 has tapped the NFC device 1102 with his mobile device 1104. The mobile application on the mobile device 1103 may also send and receive event data to and from the server 1106 through the public computer or communications network 1105. If the event data indicates that the employee 1104 is scheduled to clock in the work zone 1101, the mobile application may clock in to the employee 1104, manually or automatically (step 1107), as explained earlier in FIG. 1.

Figure 12:
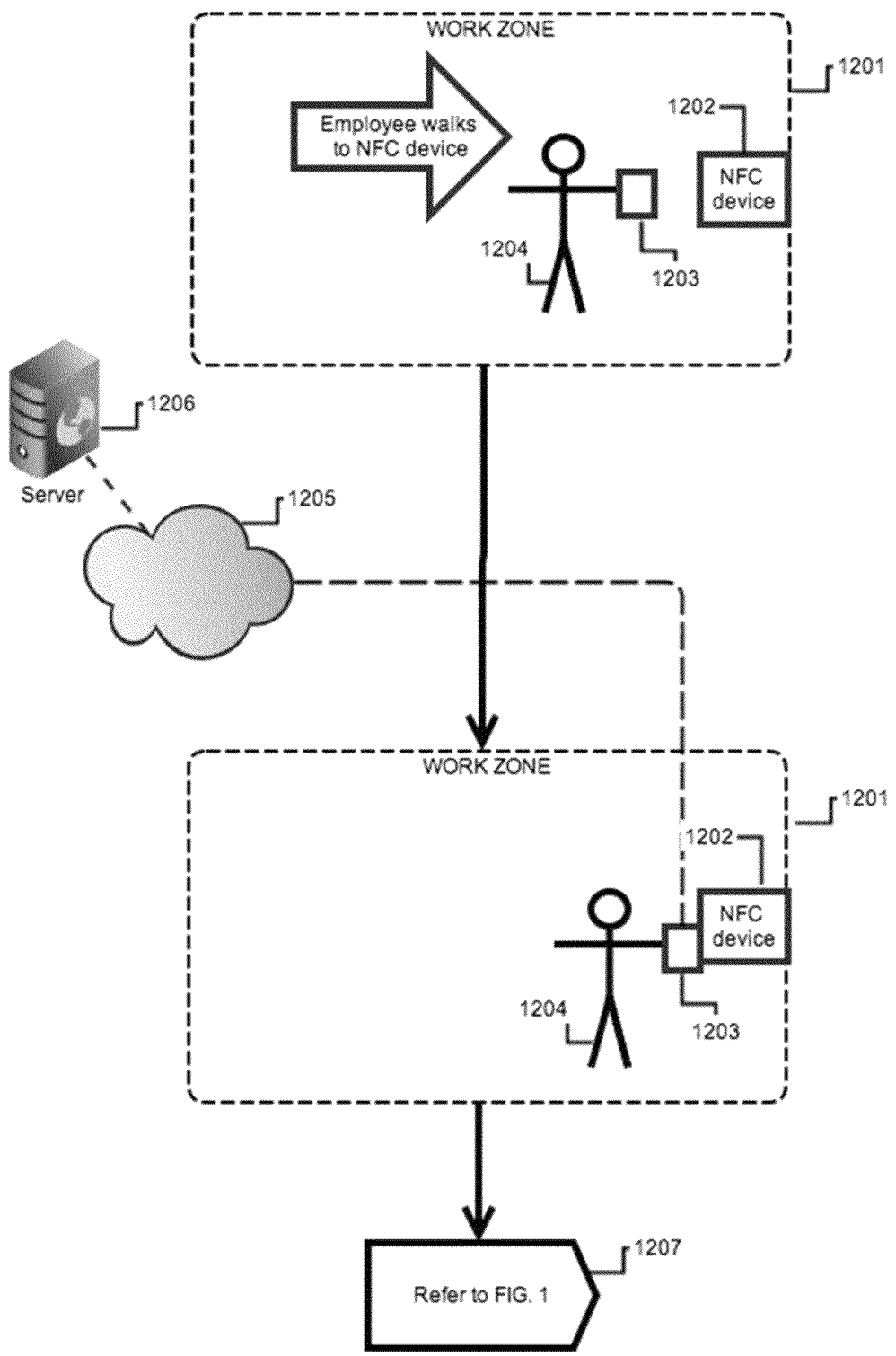
FIG. 12 graphically illustrates an exemplary embodiment of the method of the present invention with a NFC device in the case of an employee clocking out.

FIG. 12 graphically illustrates an exemplary embodiment of the method of the present invention with a NFC device in the case of an employee clocking out. When the employee 1204 clocks out, the employee 1204 with his mobile device 1203 may move towards the NFC device 1202 in the work zone 1201. The employee 1204 may tap the NFC device 1202 with his mobile device 1203. As mentioned earlier, tapping the NFC device 1202 with the mobile device 1203 may involve positioning the mobile device 1203 near the NFC device 1202 or may involve direct physical contact between the two devices. The mobile application on the mobile device 1203 may detect a signal from the NFC device 1202, and the mobile application may send a message to the server 1206 through a public computer or communications network 1205. The message may inform the server 1206 that the employee 1204 has tapped the NFC device 1202 with his mobile device 1203. As mentioned earlier, the mobile application may also send and receive event data to and from the server 1206. If the event data received by the mobile application indicates that the employee 1204 is scheduled to clock out of the work zone 1201, the mobile application may clock in the employee, manually or automatically (step 1207) as explained in FIG. 1.

Exemplary Embodiments using GPS Technology

Figure 13:
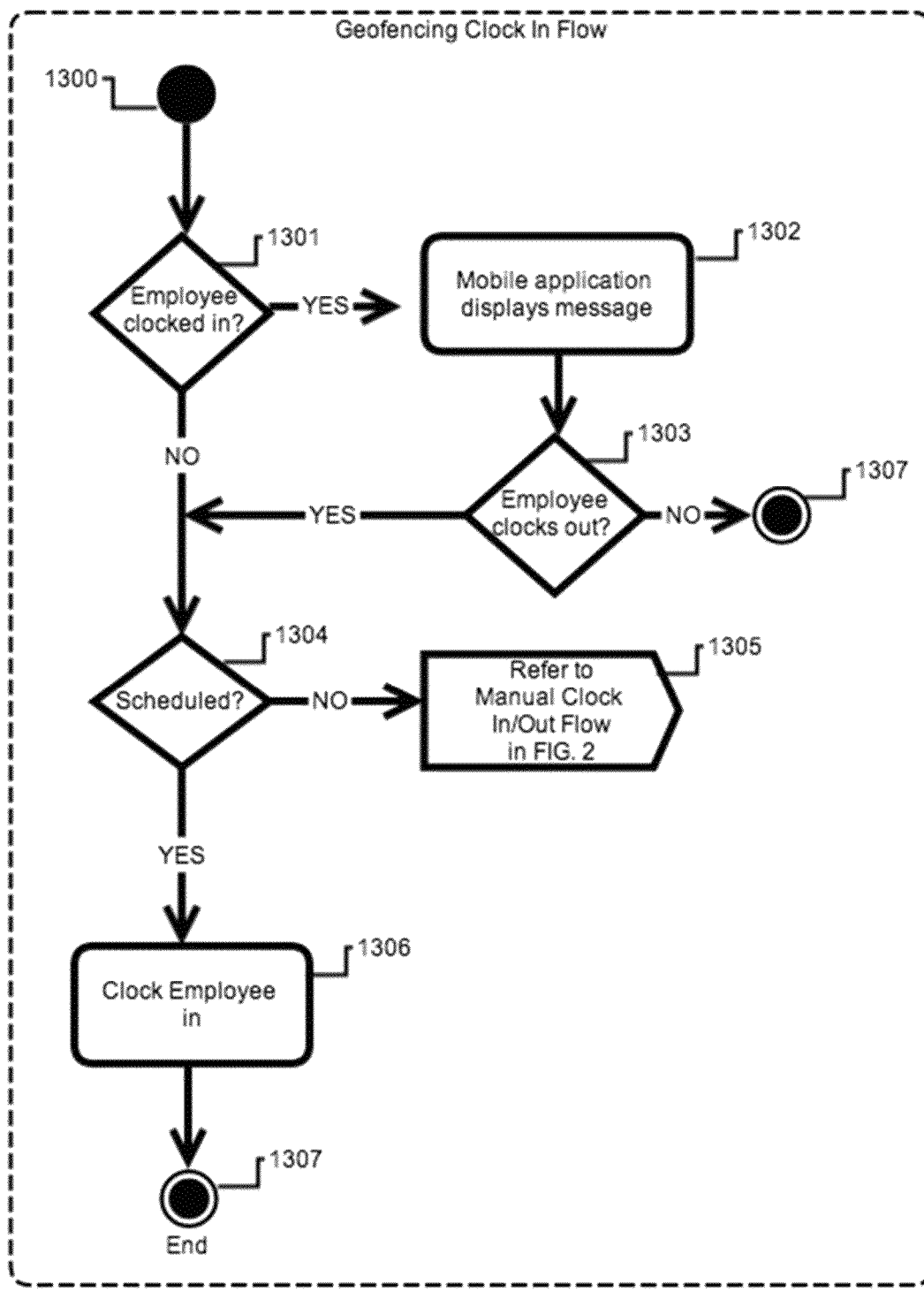
FIG. 13 illustrates a flow diagram of an exemplary embodiment of the present invention involving a clock in flow using global positioning system (GPS) technology.

FIG. 13 illustrates a flow diagram of an exemplary embodiment of the present invention involving a clock in flow using global positioning system (GPS) technology. Using GPS technology, GPS coordinates may be used to define an area around the pinpoint location associated with the GPS coordinates ("GPS location"). This area surrounding this GPS location may be exactly the same size as the work zone. In another embodiment, the area surrounding the GPS location may be larger than the work zone yet surrounding the work zone. Such area allowance may be to allow for administrative equipment that do not directly relate with the work zone. The area enclosed therefore "geofenced," and the boundaries of this area represent the "geofence." The geofenced work zone may be defined before an employee enters the work zone. When the employee enters a predefined geofenced area that includes the work zone (step 1300), the mobile application on the employee's mobile device may check if the employee has already clocked in (step 1301). If the mobile application determines that the employee has already clocked in, then the mobile application may display a message on the GUI to prompt action from the user (step 1302). The message may inform the employee that he is already clocked in and may need to clock out before clocking back in. If the employee chooses not to clock out at step 1303, then the mobile application may stop attempting to clock in the employee (step 1307). If, on the other hand, the employee chooses to clock out after being informed about being already clocked in (step 1303), then the mobile application may return to the steps that may occur if the employee was not clocked in. Thereby, if the employee is not already clocked in or if the employee chooses to clock out when he was already clocked in, then the mobile application may communicate with the server through a public computer or communications network to retrieve the employee's work schedule. Upon receiving the employee's work schedule, the mobile application will determine if the employee is scheduled to clock in (step 1304). If the employee is not scheduled to work or clock in, then the mobile application may manually clock in the employee (step 1305), as explained earlier in reference to FIG. 2. If, on the other hand, the employee is scheduled to work or clock in, then the mobile application may clock the employee in (step 1306), manually or automatically. After step 1306, the clock in activity may end (step 1307).

Figure 14:
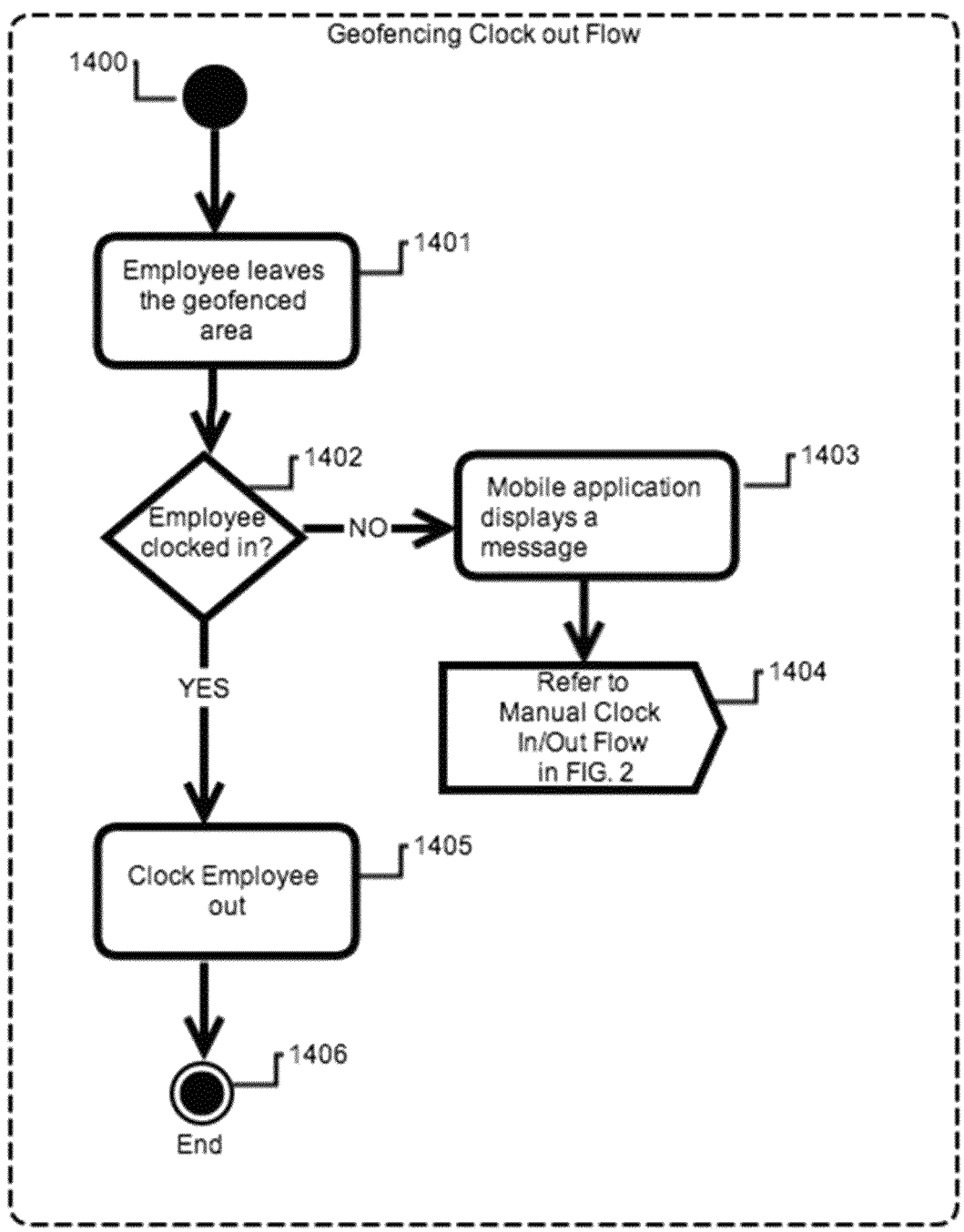
FIG. 14 illustrates a flow diagram of an exemplary embodiment of the present invention involving a clock out flow using global positioning system (GPS) technology.

FIG. 14 illustrates a flow diagram 1400 of an exemplary embodiment of the present invention involving a clock out flow using global positioning system (GPS) technology. As explained earlier, GPS coordinates may be used to define an area around the pinpoint location associated with the GPS coordinates ("GPS location"). The boundaries of this area surrounding the GPS location may be considered the geofence. When an employee leaves the work zone (step 1400), the mobile application may detect that it and the employee has left the geofenced area (step 1401). Upon detecting that the employee's location is not within the geofenced area, the mobile application may determine if the employee has clocked in (step 1402). If the mobile application determines that employee has not clocked in, then the mobile application may display a message on the GUI informing the employee that the mobile application cannot find a record of the employee clocking in (step 1403). After step 1403, the mobile application may assist the employee with manually clocking in/out (step 1404), as explained earlier in FIG. 2. If, on the other hand, the mobile application determined that the employee had clocked in, then the mobile application may clock out the employee, manually or automatically (step 1405). After step 1405, the clock out activity may end (step 1406).

Figure 15:
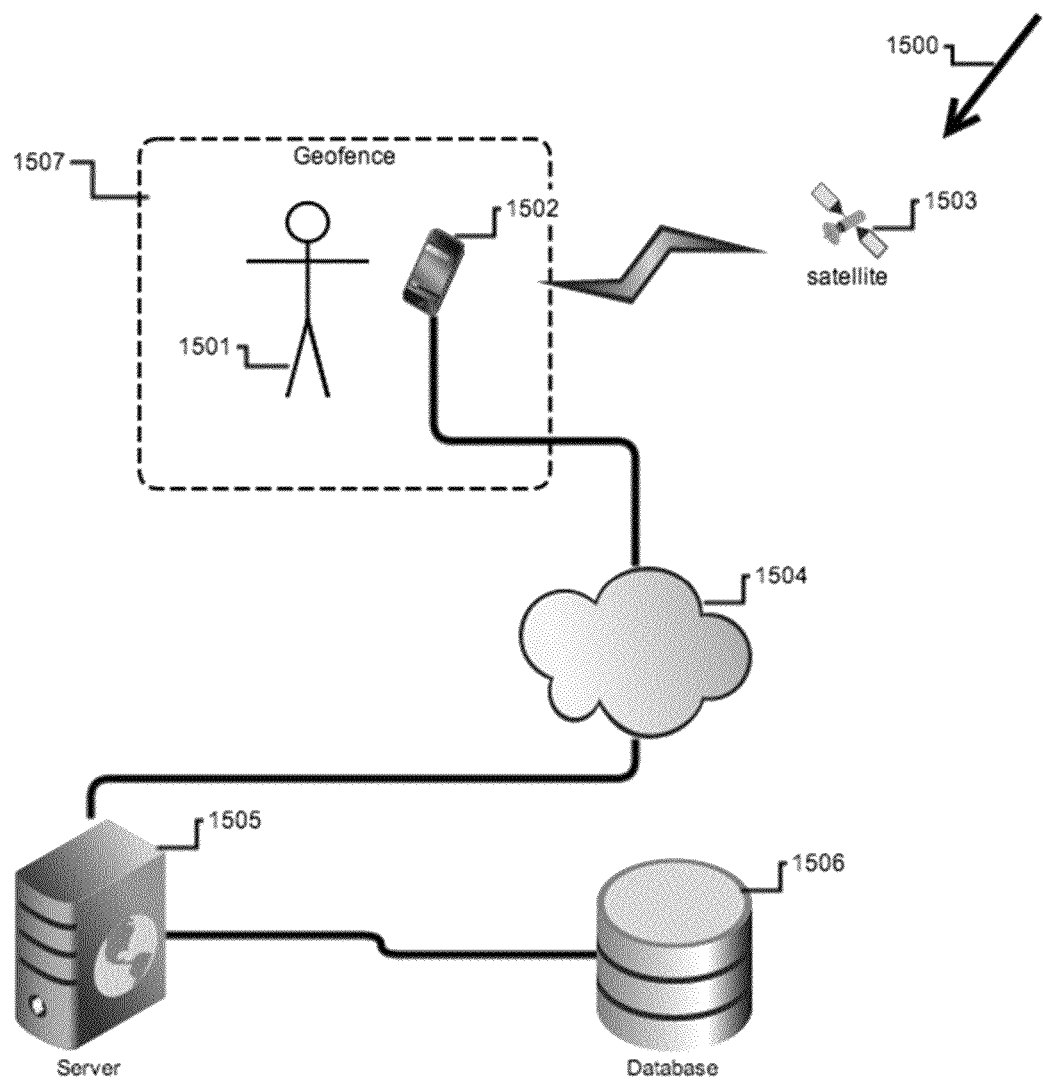
FIG. 15 illustrates an exemplary embodiment of a system used in the clock in/out process using GPS technology.

FIG. 15 illustrates an exemplary embodiment of a system 1500 of components used during a clock in/out flow using GPS technology. An employee 1501 may own or possess a mobile device 1502. The mobile application on the mobile device 1501 may be configured to detect GPS signals from a satellite 1503. From GPS signals, the mobile application may be able to determine location and whether the mobile device is within a geofenced area 1507. When the mobile application on the mobile device 1502 detects the mobile device is inside a geofenced area 1501, the mobile application communicates to the server 1504 through a public computer or communications network 1504 that the mobile device 1502 has entered the predefined geofenced area 1507. The server 1505 may send event data to the mobile device 1502 through the public computer or communications network, and server 1505 may also send and receive event data to and from the database 1506. The event data may be read and written in the database 1506.

Figure 16:
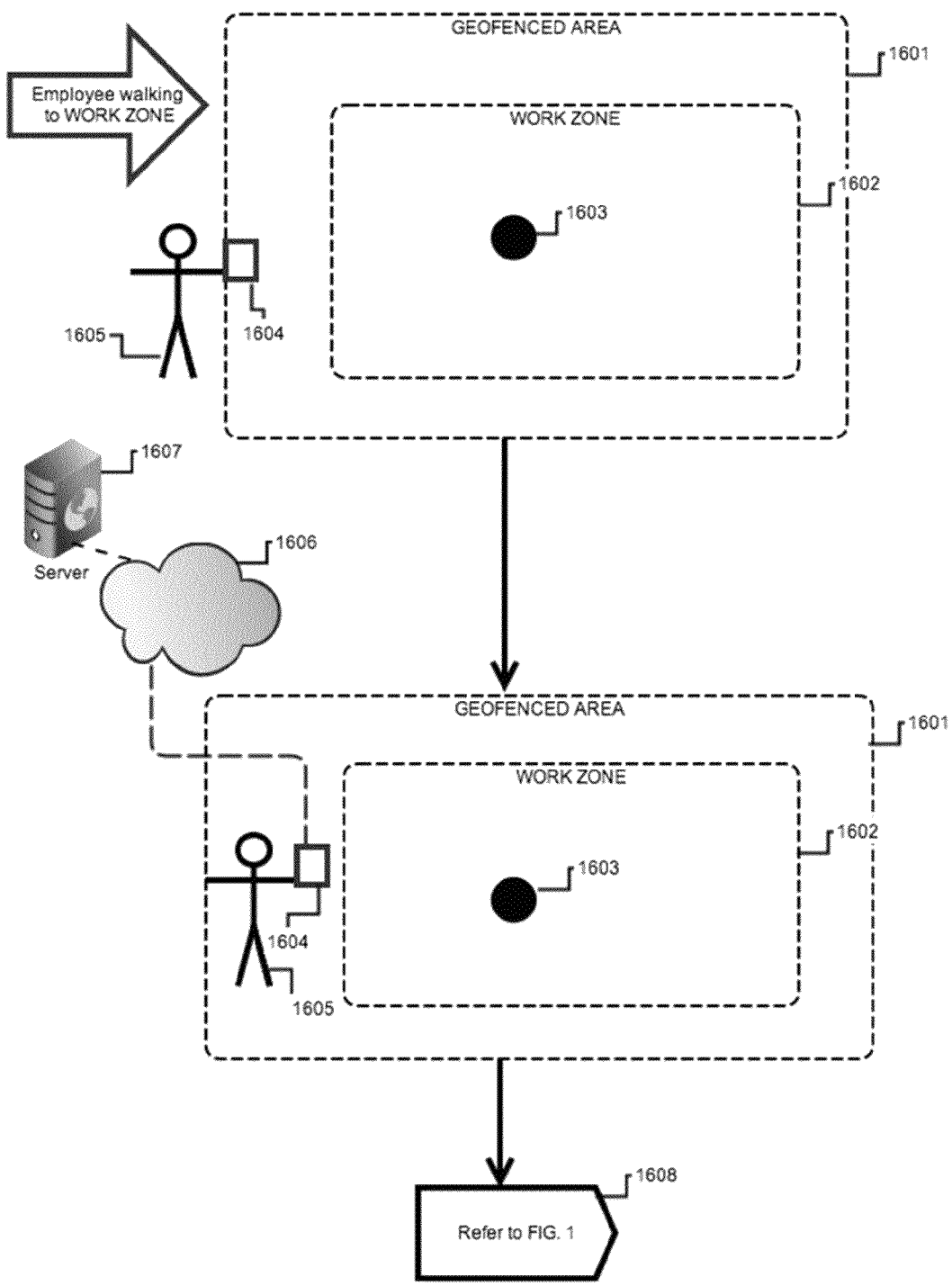

FIG. 16 graphically illustrates an exemplary embodiment of the method of the present invention using a geofencing technique in the case of an employee clocking in. A work zone 1602 may be inside a larger geofenced area 1601. The work zone 1602 may also be the size of the geofenced area 1601. In one exemplary embodiment, the predefined geofenced area 1601 may be defined by GPS coordinates 1603 located inside the work zone 1602. In such embodiment, the geofenced area 1601 may be a predefined area based on the GPS coordinates 1603. When the employee 1605 moves towards a work zone 1602, which may be inside a predefined geofenced area 1601, the mobile application installed on the mobile device 1604 may determine that based on GPS signals the mobile device 1604 is inside the geofenced area 1601. When the mobile application determines that the mobile device is inside the geofenced area, the mobile application on the mobile device 1604 sends to the server 1607 through a public computer or communications network 1606 a message to determine if the employee 1605 is scheduled to clock in. Once the mobile application determines if the employee 1605 is scheduled to clock in, then the mobile application may clock in the employee 1605, manually or automatically, as explained in FIG. 1.

Figure 17:
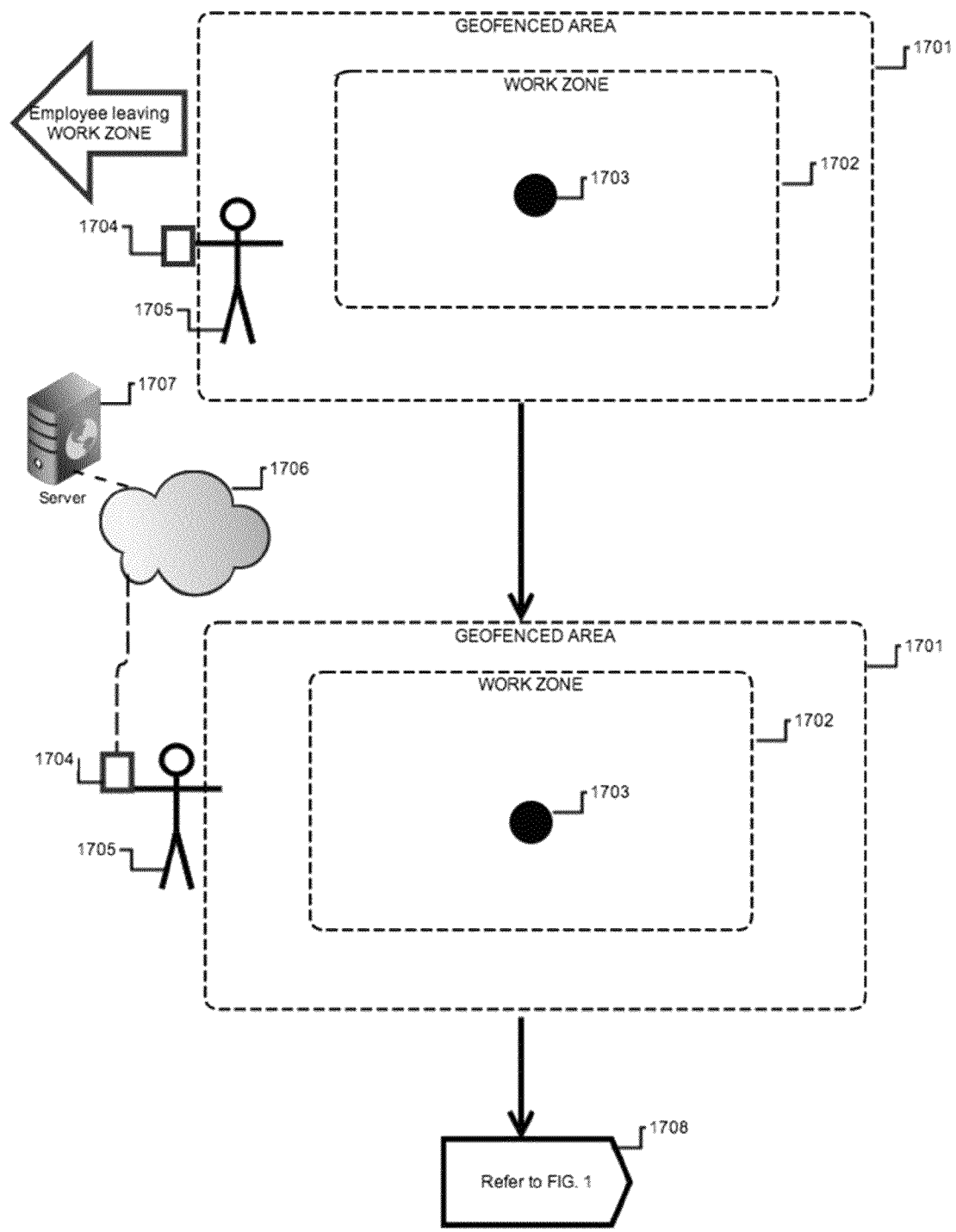
FIG. 17 graphically illustrates an exemplary embodiment of the method of the present invention using a geofencing technique in the case of an employee clocking out.

FIG. 17 graphically illustrates an exemplary embodiment of the method of the present invention using a geofencing technique in the case of an employee clocking out. As mentioned earlier, a geofenced area 1701 that encompasses the work zone 1702 may be defined as a predefined area around GPS coordinates 1703. When the employee 1705 attempts to leave the work zone 1702, which is inside a predefined geofenced area 1701, the mobile application on the mobile device 1704 may determine that the mobile device 1704 is outside the geofenced area 1701, and thereby the work zone 1702. Upon determining that the mobile device 1704, and subsequently the employee 1705, is not inside the geofenced area 1701, the mobile application may sends a message to the server 1707 through a public computer or communications network 1706 to determine if the employee 1705 is scheduled to clock out. If the employee 1705 is scheduled to clock out, then the mobile application may clock out the employee 1705 (step 1708), manually or automatically, as explained earlier in reference to FIG. 1. If, on the other hand, the employee is not scheduled to clock out, the mobile application may take steps as explained later in reference to FIG. 20.

Alternative Exemplary Embodiments

Figure 18:
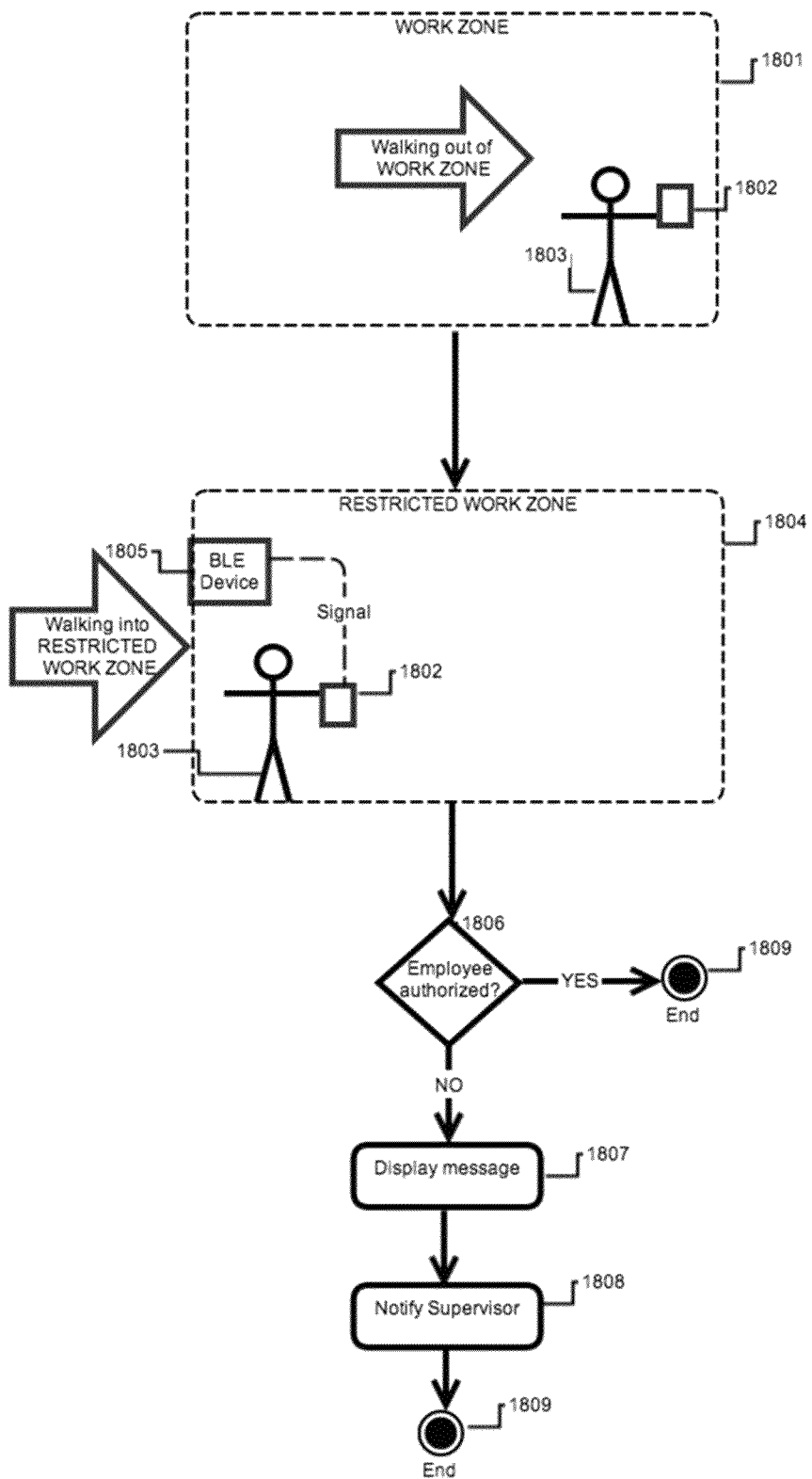
FIG. 18 graphically illustrates an exemplary embodiment of the present invention in which a mobile application may notify a supervisor if an employee enters a restricted work zone.

FIG. 18 graphically illustrates an exemplary embodiment of the present invention in which a mobile application may notify a supervisor if an employee enters a restricted work zone. This exemplary embodiment may be used when an employee leaves a work zone and is not scheduled to clock out at the time he leaves the work zone. This exemplary embodiment may use any, or any combination, of the previously mentioned location tracking embodiments of the present invention. Additionally, this exemplary embodiment may be used in any of the previously discussed embodiments. FIG. 18 illustrates the exemplary embodiment using a BLE device. A restricted work zone 1804 may be an area that the employee is not authorized to enter or to be in. The mobile application on the mobile device 1802 may keep track of the areas in which the employee 1803 is authorized to be. When the employee 1803 leaves a work zone 1801, in which the employee 1803 is authorized to be, and enters a restricted work zone 1804, the mobile application on the mobile device 1802 may detect a signal from a BLE device 1805 associated with the restricted work zone 1804. The mobile application may communicate a server through a public computer or communications network to retrieve event data that would assist in determining if the employee 1803 is authorized to be in the restricted work zone 1804 (step 1806). Event data may include a list of work zones in which the employee is authorized to be. Upon receiving event data from the server, if the mobile application determines that the employee 1803 is authorized to be inside the restricted work zone 1804, then the mobile application may not notify a supervisor. If, on the other hand, the mobile application determines that the employee 1803 is not authorized to be inside the restricted work zone 1804, the mobile application may display a message (step 1807) informing the employee 1803 that he is not authorized to be at the restricted work zone 1804. The server may send a notification to a supervisor (step 1808) about the employee entering the restricted work zone 1804 without authorization. After step 1806 or step 1808, the mobile application may resume the step that it may have interrupted to react to the employee entering a restricted work zone (step 1809).

Figure 19:
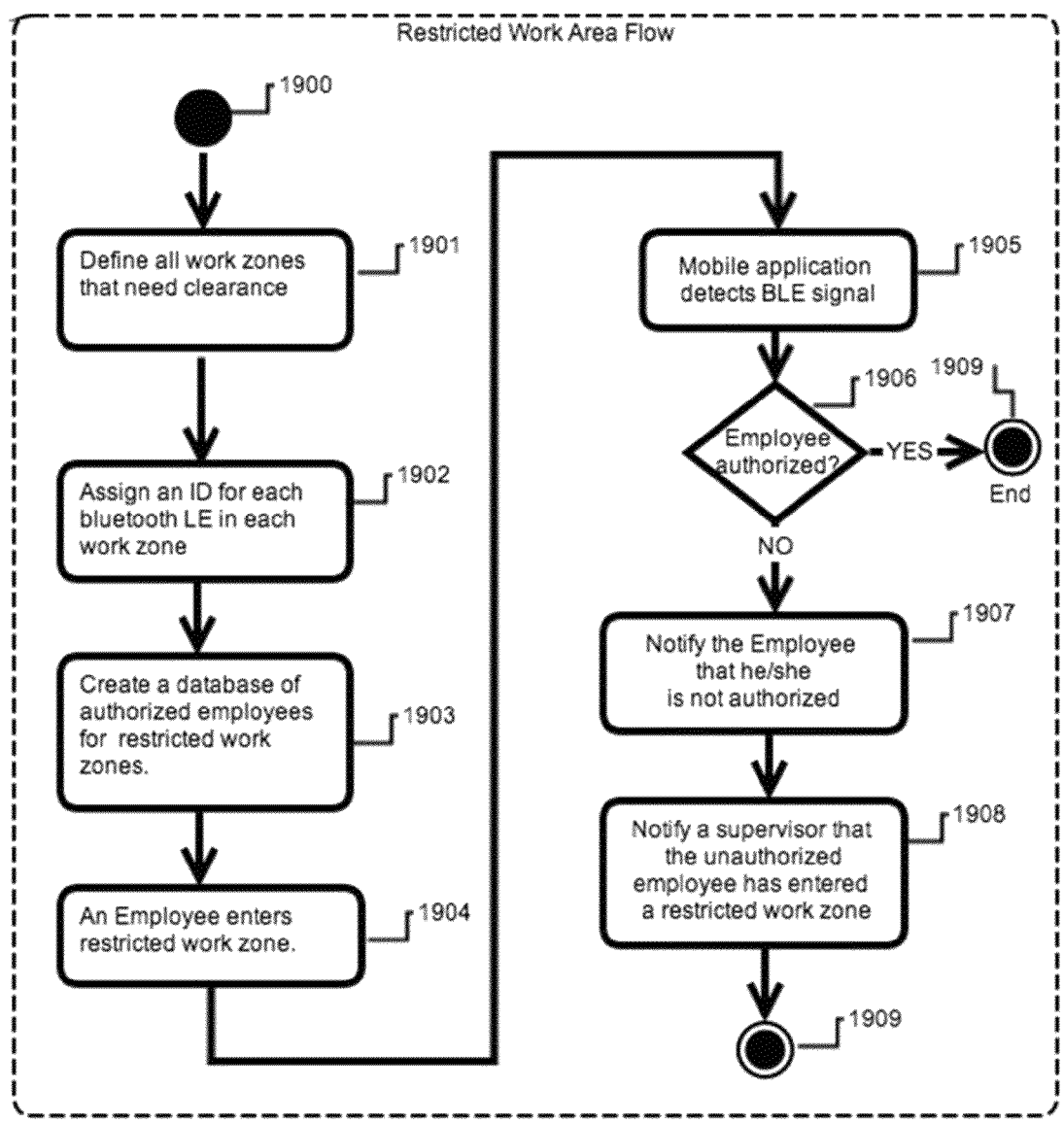
FIG. 19 illustrates a flow diagram of an exemplary embodiment of the present invention in which a mobile application may use signals from a BLE device to determine if an employee enters a restricted work zone and subsequently notify a supervisor about the unauthorized entrance into the restricted work zone.

FIG. 19 illustrates a flow diagram 1900 of an exemplary embodiment of the present invention in which a mobile application may use signals from a BLE device to determine if an employee enters a restricted work zone and subsequently notify a supervisor about the unauthorized entrance into the restricted work zone. This exemplary embodiment may use any, or any combination, of the previously mentioned location tracking embodiments of the present invention. Additionally, this exemplary embodiment may be used in any of the previously discussed embodiments. A supervisor or manager may define work zones that are restricted and require clearance from a supervisor or manager before an employee may enter (step 1901). A BLE device is placed at each restricted work zone, and each BLE device is assigned a unique identifier (step 1902). The supervisor or manager may identify employees that are authorized to be in the restricted work zones, and input the list of authorized employees into a database (step 1903). After inputting the list of authorized individuals into the database, when an employee enters a restricted work zone (step 1904), the mobile application on the mobile device may detect a signal from the BLE device placed at the restricted work zone (step 1905). The mobile application may then communicate with the server to determine whether the employee is authorized to be at the restricted work zone (step 1906). The mobile application may receive from the server a message that informs the mobile application whether the employee is authorized to be at the restricted work zone. If the mobile application determines that the employee is authorized to enter or be in the restricted work zone, then the mobile application may take no further action (step 1909) and may not notify a supervisor. If, on the other hand, the mobile application determines that the employee is not authorized to enter or be in the restricted work zone, then the mobile application may display a message informing the user that he is not authorized to be at the restricted work zone (step 1907). The mobile application may then notify a supervisor that the unauthorized employee entered the restricted work zone (step 1908). After step 1908, the mobile application may take no further action (step 1909).

Figure 20:
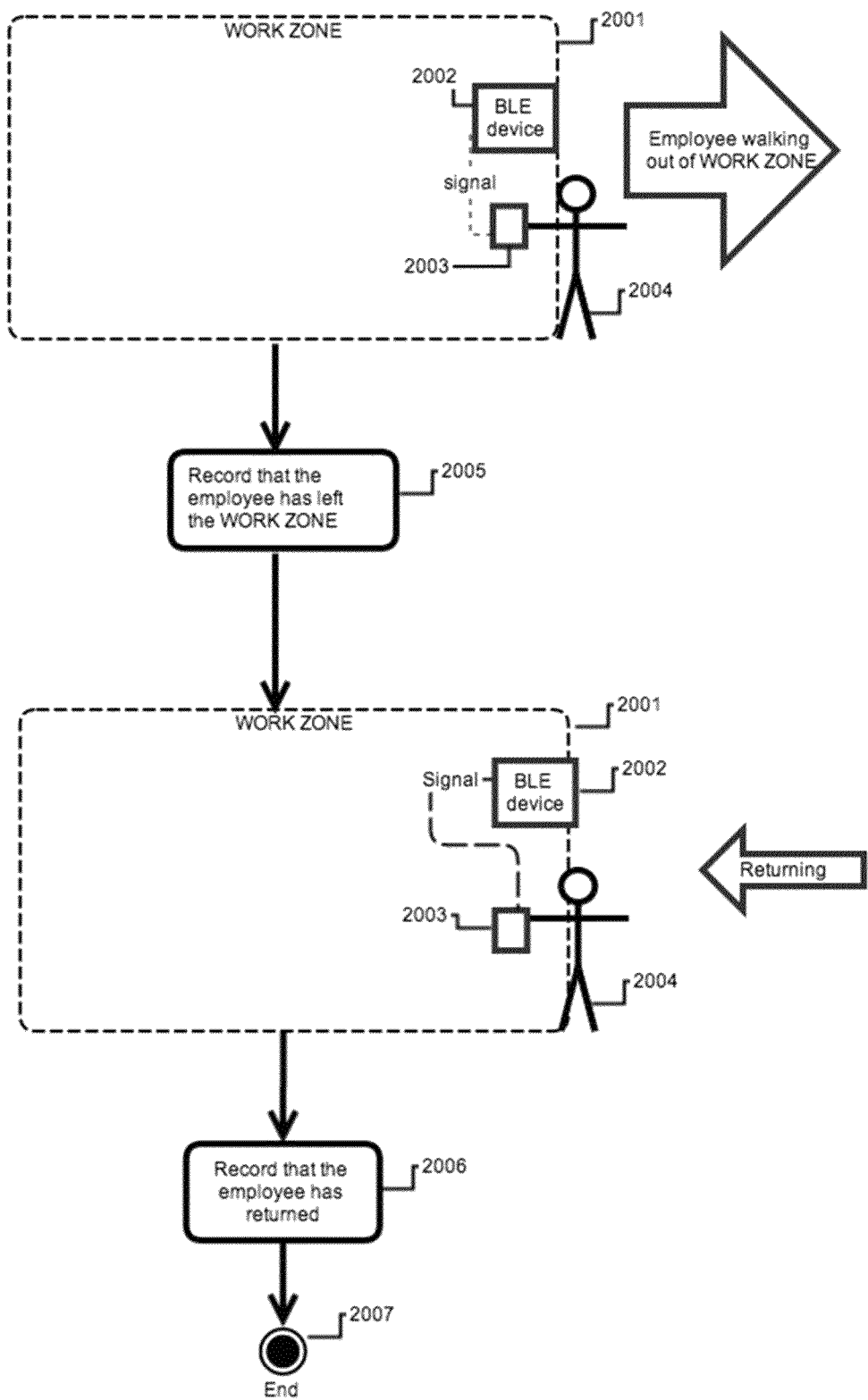
FIG. 20 graphically illustrates an exemplary embodiment of the method of the present invention in which a mobile application may be use a signal from a BLE device to identify when an employee leaves and returns to a work zone during his scheduled work shift, and records the times of exit and entrance.

FIG. 20 graphically illustrates an exemplary embodiment of the method of the present invention in which a mobile application may be use a signal from a BLE device to identify when an employee leaves and returns to a work zone during his scheduled work shift, and records the times of exit and entrance. The mobile application may record the time at which the employee took a break, the duration of the break, and the number of breaks the employee takes during his scheduled work shift. This exemplary embodiment may use any, or any combination, of the previously mentioned location tracking embodiments of the present invention. Additionally, this exemplary embodiment may be combined with any of the previously discussed embodiments. When the employee 2004 moves out of the work zone 2001 with his mobile device 2003, the employee may pass by the BLE device 2002, located near the exit of the work zone 2001. The mobile application on the mobile device may detect a signal from the BLE device 2002, and the mobile application may communicate with a server through a public computer or communications network. The mobile application may send to the server a message stating that the employee has left the work zone. The server may record the information concerning the employee's departure from the work zone (step 2005) (e.g., the time that the employee left the work zone). When the employee 2004 returns to the work zone 2001, the mobile application on the mobile device 2003 may detect a signal from the BLE device 2002. The mobile application then may communicate with the server through a public computer or communications network. The mobile application may communicate to the server that the employee has entered the work zone. The server may record the information regarding the employee's re-entrance into the work zone (step 2006) (e.g., the time that the employee returned to the work zone) and may store the information in a database. After step 2006, the mobile application may take no further action and resume the step that the mobile application may have interrupted when the employee 2004 left the work zone 2001 (step 2007). Using the information about the employee's departure from and re-entrance into the work zone, the mobile application may determine the duration of the employee's absence from the work zone 2001. The mobile application may also use the information to determine the number of the employee's absences from the work zone 2001.

Figure 21:
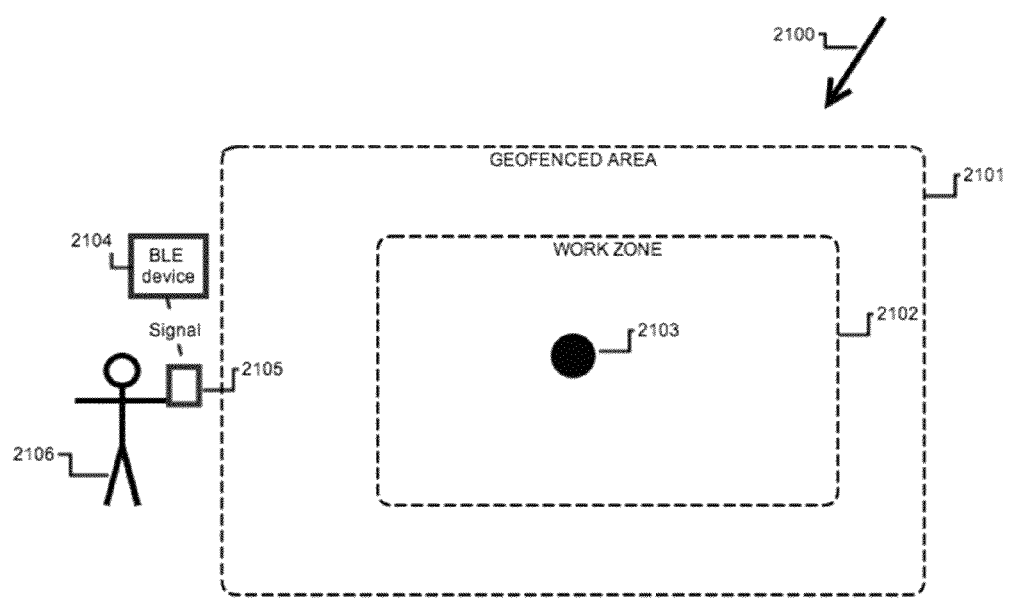
FIG. 21 illustrates an exemplary embodiment of the system of the present invention in which two of location tracking embodiments of the present invention may be used together to clock in/out an employee.

FIG. 21 illustrates an exemplary embodiment of the system 2190 of the present invention in which two of location tracking embodiments of the present invention may be used together to clock in/out an employee. This particular exemplary embodiment illustrates the use of BLE devices in conjunction with GPS technology. This exemplary embodiment may use any, or any combination, of the previously mentioned location tracking embodiments of the present invention. Such an exemplary embodiment may be used for work zones with no office or with no defined physical perimeter. In another exemplary embodiment, a BLE device 2104 may be installed inside a car or inside a booth at a venue. The BLE device 2104 may be used to verify that the employee's mobile device 2105 is located in the area of signal propagation from the BLE device 2104. The geofencing technique, as explained earlier, may be used to ensure the BLE device 2104 is in the work zone 2101 since the BLE device 2104 may be moved. The exemplary embodiment illustrated in FIG. 22 demonstrates an embodiment in which the employee 2106 may not be able to clock in/out. In such embodiment, the BLE device 2104 is positioned outside the geofenced area 2101, which, as explained earlier, may be defined by an area surrounding GPS coordinates 2103 within the work zone 2102. Even though the employee 2106 has positioned the mobile device 2104 near the BLE device 2104, the mobile application on the mobile device 2104 may not clock in/out the employee 2106 because the employee's location, determined by the GPS coordinates received by the mobile application from a GPS satellite, is not in the geofenced area 2101.

Figure 22:
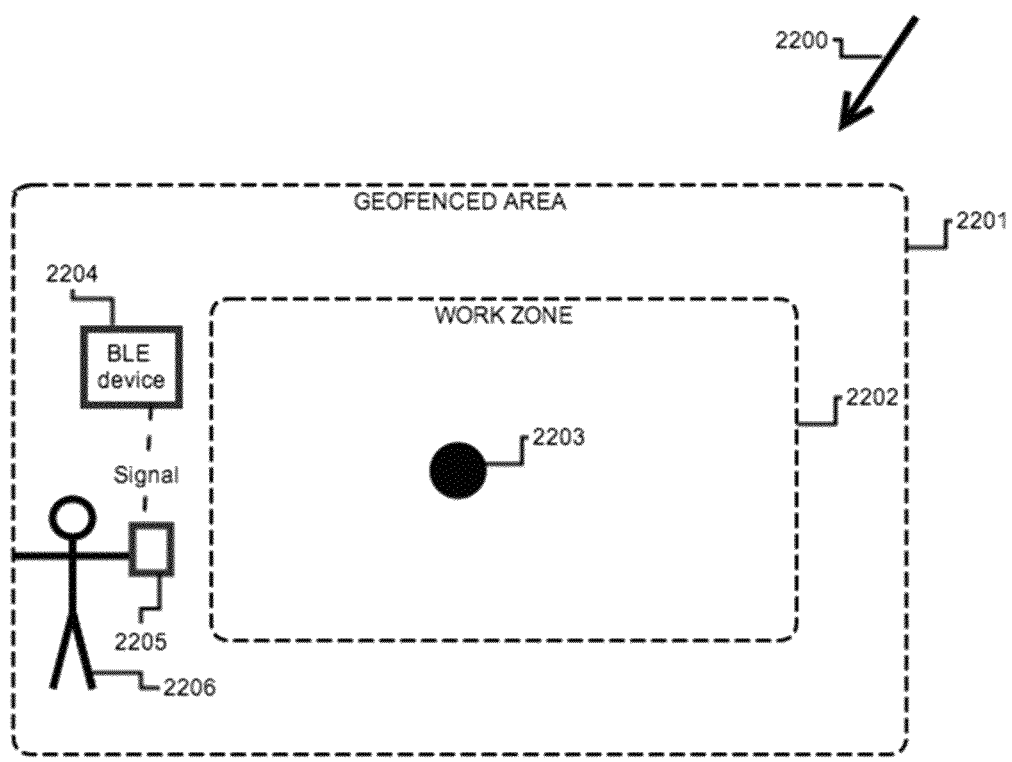
FIG. 22 illustrates an exemplary embodiment of the system of the present invention in which two of location tracking embodiments of the present invention may be used together to clock in/out an employee and the placement of one of location tracking embodiments affects the ability of an employee to clock in/out.

FIG. 22 illustrates an exemplary embodiment of the system 2200 of the present invention in which two of location tracking embodiments of the present invention may be used together to clock in/out an employee and the placement of one of location tracking embodiments affects the ability of an employee to clock in/out. This exemplary embodiment may use any, or any combination, of the previously mentioned location tracking embodiments of the present invention. Compared to the exemplary embodiment as illustrated in FIG. 22, this particular exemplary embodiment may allow an employee 2206 to clock in/out on the mobile application on the mobile device 2205. In this particular exemplary embodiment, the mobile device 2205 is positioned near a BLE device 2204, and the mobile device may detect a signal from the BLE device 2204. The BLE device 2204 may also be located inside the geofenced area 2201, which, as explained earlier, may be defined by an area surrounding GPS coordinates 2203 within the work zone 2202. With the BLE device 2204 located inside the geofenced area 2201, the employee's location, determined by GPS coordinates received by the mobile application from a GPS satellite, is thereby in the geofenced area 2201, and the mobile application may allow the employee to clock in/out, manually or automatically.

Figure 23:
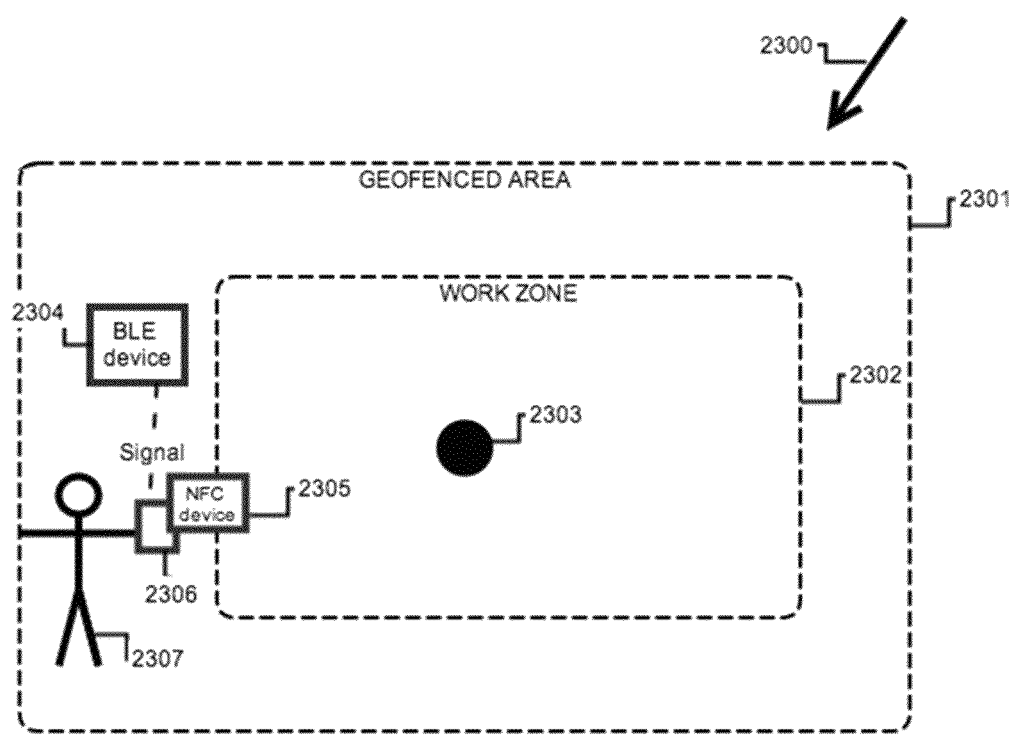
FIG. 23 illustrates an exemplary embodiment of the present invention in which the three previously mentioned location tracking embodiments may be combined to clock in/out an employee. Such exemplary embodiment of the present invention may be used with work zones with no established office or with no defined physical perimeter.

FIG. 23 illustrates an exemplary embodiment of the system 2300 of the present invention in which the three previously mentioned location tracking embodiments may be combined to clock in/out an employee. Such exemplary embodiment of the present invention may be used with work zones with no established office or with no defined physical perimeter. In one exemplary embodiment, a BLE device 2304 may be installed inside a car or inside a booth at a venue. In another exemplary embodiment, an employer may wish to verify the employee's presence in the work zone 2302. In such exemplary embodiment, the mobile application may randomly prompt the employee 2307 to verify his presence within the work zone 2302. The employee 2307 may verify his presence by tapping the NFC device 2306 with the mobile device 2304. The BLE device 2304 may be used to verify that the employee's mobile device 2306 is located near the BLE device 2304 and thereby is receiving a signal from the BLE device 2304. The geofencing technique, as explained earlier in reference to FIG. 21 and FIG. 22, may be used to ensure the BLE device 2304 is inside the geofenced area, especially since the BLE device may be moved. FIG. 23 illustrates an exemplary embodiment of the present invention in which an employee may be able to clock in/out. In such embodiment, the mobile device 2306, owned by or associated with the employee 2307, receives a signal from a BLE device 2304. The BLE device is located inside the geofenced area 2301, which, as explained earlier, may be defined by an area surrounding GPS coordinates 2303 within the work zone 2302. The employee 2304 may clock in/out by tapping the mobile device 2306 to the NFC device 2305.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Detailed Description" any claims issuing from the subject matter taught in the present disclosure should not be limited by the language chosen under this heading to describe the so-called field. Further, a description of any technology as background or conventional is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method of tracking an employee at work where the work is performed in at least one work zone, comprising the steps:
    inputting a work schedule for the employee;
    tracking, via at least one low energy device, an employee's location within the at least one work zone, wherein the employee's location is determined by scanning, via a mobile device associated with the employee, for a wireless signal emitted from the at least one low energy device, wherein the wireless signal indicates the location of the employee within the at least one work zone, and wherein the at least one work zone has predefined boundaries detectable via a low energy device;
    retrieving, via the mobile device, the work schedule from a server connected to the mobile device via a network;
    in response to the wireless signal detected by the employee's mobile device, automatically clocking in if the employee is currently scheduled to work according to the work schedule;
    recording a work time spent by the employee in the at least one work zone during the work schedule; and
    reporting the recorded work time.

2. The method of claim 1 further comprising prompting the employee with a message to clock in/out.

3. The method of claim 1 further comprising notifying a supervisor if the employee's location does not match the at least one work zone.

4. The method of claim 1 further comprising defining at least one prohibited work zone that is distinct from the at least one work zone.

5. The method of claim 1 further comprising randomly prompting the employee to validate the employee's actual attendance in the work zone.

6. The method of claim 1 further comprising using a mobile device associated with the employee to communicate with the at least one low energy device.

7. The method of claim 1 further comprising prompting the employee to clock in or clock out with an email sent to the employee.

8. The method of claim 6 further comprising prompting the employee to manually clock in or clock out, wherein manually clocking in or clocking out comprises opening an application on the mobile device and pressing a clock in or a clock out button.

9. The method of claim 6 further comprising receiving a notification to prompt the employee to clock in or clock out.

10. The method of claim 6 wherein the mobile device is enabled for Near Field Communication, the low energy device is enabled for Near Field Communication, and communication between the mobile device and the low energy device comprises tapping the mobile device to the low energy device.

11. The method of claim 6 wherein using the mobile device comprises using a Bluetooth enabled mobile device.

12. The method of claim 6 further comprising caching data on the mobile device, wherein data comprises the employee's location, the employee's clock in time, and the employee's clock out time.

13. The method of claim 1 further comprising automatically clocking in or clocking out the employee when the employee enters/exits the work zone.

14. The method of claim 1 wherein tracking the employee's location within a work zone comprises using Global Positioning System coordinates, wherein the work zone is "marked off" with Global Positioning System coordinates and the employee's location is Global Positioning System coordinates and the low energy device comprises a mobile device.

15. The method of claim 1 further comprising tracking departures from and entrances into the work zone by the employee during the scheduled work shift.

16. The method of claim 2 further comprising:
    prompting the employee to confirm overriding the work zone; and
    overriding the scheduled work zone with the employee's location.

17. A method for accurately and automatically tracking an employee's time spent working according to the employee's schedule and presence within a work zone, comprising the steps:
    scanning, via a mobile device associated with an employee, for a wireless signal emitted from a low energy device, wherein the wireless signal indicates the location of the employee within a work zone, and wherein the work zone has predefined boundaries detectable via a low energy device;
    if the wireless signal is detected by the mobile device, sending a request to a server from a mobile application on the mobile device, wherein the server is connected to the mobile device via a network;
    receiving at the mobile application a response from the server, the response comprising a work schedule for the employee;
    recording, via the mobile application, an entrance time;
    triggering a clock-in event on the mobile application (i) if the mobile application determines, based on the detected wireless signal, that the employee is located within the work zone, and (ii) if the entrance time occurred within a scheduled work shift according to the received work schedule.

18. A mobile device for accurately and automatically tracking an employee's time spent working according to the employee's schedule and presence within a work zone, comprising:
    a processor;
    a network interface;
    a low energy device receiver configured to scan for a wireless signal emitted from a low energy device, wherein the mobile device is associated with an employee, wherein the wireless signal indicates the location of the employee within a work zone, and wherein the work zone has predefined boundaries detectable via a low energy device;
    a mobile application executing on the processor, wherein the mobile application is configured to:
        communicate with the low energy device receiver;
        send a request to a server via the network interface if the wireless signal is detected by the low energy device receiver;
        receive a response from the server, the response comprising a work schedule for the employee;
        record an entrance time;
        trigger a clock-in event (i) if the mobile application determines, based on the detected wireless signal, that the employee is located within the work zone, and (ii) if the entrance time occurred within a scheduled work shift according to the received work schedule.

19. The mobile device of claim 18 wherein the low energy device is a Global Positioning System, and wherein the predefined boundaries of the work zone are defined in terms of Global Positioning System coordinates.

20. The mobile device of claim 18 wherein the low energy device sends and receives signals using Near Field Communication technology.

21. The mobile device of claim 18 wherein the low energy device communicates using Bluetooth, and wherein at least one boundary of the predefined boundaries of the work zone is defined by the signal range of the low energy device located within the work zone.

22. An employee tracking system for accurately and automatically tracking an employee's time spent working, comprising:
    a low energy device;
    a work zone having boundaries defined according to a wireless signal emitted by the low energy device;
    a network;
    a database configured to store event data, the event data comprising a work schedule for the employee;
    a server connected to the network, the server configured to communicate with the database and retrieve the event data upon request; and
    a mobile device associated with the employee, the mobile device configured to
        scan for a wireless signal emitted from the low energy device, wherein the wireless signal indicates the location of the employee within the work zone;
        send a request to the server via the network if the mobile device detects a wireless signal from the low energy device;
        receive a response from the server, the response comprising a work schedule for the employee;
        record an entrance time; and
        trigger a clock-in event (i) if the mobile device determines, based on the detected wireless signal, that the employee is located within the work zone, and (ii) if the entrance time occurred within a scheduled work shift according to the received work schedule.

23. The employee tracking system of claim 22 wherein the low energy device is a Global Positioning System, and wherein the predefined boundaries of the work zone are defined in terms of Global Positioning System coordinates.

24. The employee tracking system of claim 22 wherein the low energy device sends and receives signals using Near Field Communication technology.

25. The employee tracking system of claim 22 wherein the low energy device communicates via Bluetooth, and wherein at least one boundary of the predefined boundaries of the work zone is defined by the signal range of the low energy device located within the work zone.

\* \* \* \* \*